US011709848B2

(12) United States Patent
Poh et al.

(10) Patent No.: US 11,709,848 B2
(45) Date of Patent: Jul. 25, 2023

(54) FOCUSED PROBABILISTIC ENTITY RESOLUTION FROM MULTIPLE DATA SOURCES

(71) Applicant: Palantir Technologies Inc., Denver, CO (US)

(72) Inventors: Andrew Poh, San Francisco, CA (US); Anshuman Prasad, New York, NY (US); James Ding, New York, NY (US); John Holgate, Washington, DC (US); Ranajay Sen, Palo Alto, CA (US); Shuo Zheng, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 17/657,907

(22) Filed: Apr. 4, 2022

(65) Prior Publication Data

US 2022/0365938 A1    Nov. 17, 2022

Related U.S. Application Data

(63) Continuation of application No. 16/562,201, filed on Sep. 5, 2019, now Pat. No. 11,294,915, which is a
(Continued)

(51) Int. Cl.
*G06F 7/02* (2006.01)
*G06F 16/00* (2019.01)
(Continued)

(52) U.S. Cl.
CPC .... *G06F 16/24578* (2019.01); *G06F 3/04842* (2013.01); *G06F 16/2455* (2019.01); *G06F 16/335* (2019.01); *G06F 16/93* (2019.01)

(58) Field of Classification Search
CPC ............... G06F 16/24578; G06F 16/93; G06F 16/2455; G06F 16/335; G06F 3/0484
See application file for complete search history.

(56) References Cited

U.S. PATENT DOCUMENTS 10,096,034 B2 * 10/2018 Kass ..................... G06Q 10/04
10,437,840 B1    10/2019 Poh et al.
(Continued)

OTHER PUBLICATIONS

U.S. Pat. No. 10,437,840, Focused Probabilistic Entity Resolution From Multiple Data Sources, Oct. 8, 2019.
(Continued)

*Primary Examiner* — Bruce M Moser
(74) *Attorney, Agent, or Firm* — Knobbe, Martens, Olson & Bear, LLP

(57) ABSTRACT

Various systems and methods are provided for performing soft entity resolution. A plurality of data objects are retrieved from a plurality of data stores to create aggregated data objects for one or more entities. One or more retrieved data objects may be associated with the same entity, based at least in part upon one or more attribute types and attribute values of the data objects. In response to a determination that the one or more of the retrieved data objects should be associated with the same entity, metadata is generated that associates the data objects with the entity, the metadata being stored separately from the data objects, such that the underlying data objects remain unchanged. In addition, one or more additional attributes may be determined for the entity, based upon the data objects associated with the entity.

20 Claims, 13 Drawing Sheets

Related U.S. Application Data continuation of application No. 15/242,335, filed on Aug. 19, 2016, now Pat. No. 10,437,840.

(51) Int. Cl.
*G06F 16/2457* (2019.01)
*G06F 3/04842* (2022.01)
*G06F 16/2455* (2019.01)
*G06F 16/93* (2019.01)
*G06F 16/335* (2019.01)

(56) References Cited

U.S. PATENT DOCUMENTS

| | | | |
|---|---|---|---|
| 10,585,893 B2 * | 3/2020 | Dantressangle | G06F 16/22 |
| 10,922,354 B2 * | 2/2021 | Circlaeys | G06V 20/30 |
| 10,986,106 B2 * | 4/2021 | Muddu | H04L 63/1433 |
| 11,294,915 B2 | 4/2022 | Poh et al. | |
| 2014/0064112 A1 * | 3/2014 | Das | G01S 5/0258 |
| | | | 370/252 |
| 2019/0228007 A1 * | 7/2019 | Beard | G06F 16/29 |

OTHER PUBLICATIONS

U.S. Pat. No. 11,294,915, Focused Probabilistic Entity Resolution From Multiple Data Sources, Apr. 5, 2022.

\* cited by examiner

USER WORKSPACE

+ Add Entities

Search for Entity — 614

Search Results:

| ID ▽ | Name ▽ | Location ▽ | Event ▽ | Score ▽ |
|---|---|---|---|---|
| 12 | Entity O | Location 5 | Event 3 | 40 |
| 20 | Entity K | Location 3 | Event 6 | 15 |
| 16 | Entity M | Location 9 | Event 7 | 58 |
| 9 | Entity U | Location 4 | Event 2 | 42 |

618 → ×

○ Finished Adding

+ Add to List

ENTITY LISTING

| ID ▽ | Name ▽ | Location ▽ | Event ▽ | Score ▽ |
|---|---|---|---|---|
| 1 | Entity A | Location 1 | Event 1 | 92 |
| 2 | Entity B | Location 2 | Event 2 | 82 |
| 3 | Entity C | Location 3 | Event 1 | 80 |

FOCUSED PROBABILISTIC ENTITY RESOLUTION FROM MULTIPLE DATA SOURCES

INCORPORATION BY REFERENCE TO ANY PRIORITY APPLICATIONS

This application is a continuation of U.S. patent application Ser. No. 16/562,201 entitled "Focused Probabilistic Entity Resolution From Multiple Data Sources" filed Sep. 5, 2019, which claims benefit of U.S. patent application Ser. No. 15/242,335 entitled "Focused Probabilistic Entity Resolution From Multiple Data Sources" filed Aug. 19, 2016, now U.S. Pat. No. 10,437,840, which is hereby incorporated by reference herein in its entirety.

Any and all applications for which a foreign or domestic priority claim is identified in the Application Data Sheet as filed with the present application are hereby incorporated by reference under 37 CFR 1.57.

TECHNICAL FIELD

The present disclosure relates to systems, methods, and techniques for entity resolution, and more specifically to performing entity resolution on data objects retrieved from a plurality of different data sources.

BACKGROUND

In many applications that involve the analysis or handling of a large number of entities, it is often beneficial to be able to focus attention and resources on the most relevant entities instead of taking a more diffuse, unfocused approach. For example, in a humanitarian aid or fraud detection context, it may be beneficial to be able to focus resources based on desired factors.

SUMMARY

The systems, methods, and devices described herein each have several aspects, no single one of which is solely responsible for its desirable attributes. Without limiting the scope of this disclosure, several non-limiting features will now be discussed briefly.

The systems, methods, and devices of the present disclosure may provide, among other features, soft entity resolution schemes in which large amounts of entity and event data, objects, features, and/or metadata are efficiently presented to a user on an interactive user interface. In various embodiments, an interactive soft entity resolution system may enable rapid and deep analysis of various entities, events, and their associated attributes by the user. In some embodiments, data objects from different data sources may be retrieved and associated with entities and/or events, allowing the user to be able to access more complete data for particular entities or events. Metadata may be generated associating different data objects from different data stores to entities and events, while preserving the content of the underlying data objects. One or more scores may be determined for each entity or event, based upon attributes values associated with the entity or event. A user interface may be generated that displays entities or events to the user, based upon the generated scores and one or more user attributes, such that the user is presented with the entities or events that are most relevant to the user.

It has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide a display of entities or events of greatest relevant to the user, each entity or event comprising data from a plurality of data objects from different data sources, and may enable a user to more quickly and accurately access, navigate, assess, and digest the data associated with particular entities or events than previous systems, without having to wade through the different data from various data sources.

Further, the interactive and dynamic user interfaces described herein are enabled by innovations in efficient interactions between the user interfaces and underlying systems and components. For example, disclosed herein are improved methods of performing entity resolution on data objects from different data sources without changing the underlying data objects, and displaying to the user data on entities or events that are of most relevance to the user. The interactions and presentation of data via the interactive user interfaces described herein may accordingly provide cognitive and ergonomic efficiencies and advantages over previous systems.

Various embodiments of the present disclosure provide improvements to various technologies and technological fields. For example, existing data resolution and user interface systems may be limited in various ways, and various embodiments of the disclosure provide significant improvements over such technology. Additionally, various embodiments of the present disclosure are inextricably tied to computer technology. In particular, various embodiments rely on detection of user inputs via graphical user interfaces, retrieval of data from different data sources, creation and storage of metadata associated with different data objects, and/or the like. Such features and others are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, data relating to various entities and events.

In an embodiment, a computer system is disclosed comprising one or more computer readable storage mediums configured to store one or more software modules including computer executable instructions and one or more computer processors in communication with the one or more computer readable storage mediums. The one or more computer processors may be configured to execute the one or more software modules in order to cause the computer system to retrieve a plurality of data objects from a plurality of data stores, the data stores comprising at least a first data store containing data objects corresponding to entities, and a second data store containing data objects corresponding to events. The one or more processors may be further configured to cause the computer system to create aggregated data objects for one or more entities. Creating an aggregated data object for an entity comprises determining whether one or more of the retrieved data objects should be associated with the same entity, based at least in part upon one or more attribute types and attribute values associated with the one or more data objects, in response to a determination that the one or more of the retrieved data objects should be associated with the same entity, generating metadata associating the one or more data objects with the entity, wherein the metadata is stored separately from the one or more data objects, such that the one or more data objects are unchanged, and determining one or more additional attributes for the entity, based upon the data objects associated with the entity.

In some embodiments, the one or more computer processors are further configured to identify at least a portion of the attributes associated with the one or more entities as scoring factors; generate one or more scores for the one or more entities, based at least in part upon one or more values for the scoring factors for the entities determined using the data objects and additional attributes associated with the entities; and generate user interface information for displaying at least a portion of the entities, based at least in part upon the generated scores for the entities.

In some embodiments, generating scores for the one or more entities comprises, for an entity of the one or more entities, processing the one or more scoring factors associated with the entity using a scoring model; and generating a score for the entity using the scoring model.

In some embodiments, the scoring model comprises one or more weights associated with the one or more scoring factors.

In some embodiments, the one or more additional attributes comprises a history attribute generated based at least in part upon one or more event data objects associated with the entity.

In some embodiments, determining whether one or more of the retrieved data objects should be associated with the same entity comprises determining a confidence value based at least in part upon the one or more attribute types and attribute values associated with the one or more data objects, wherein the data objects are associated with the same entity if the confidence value exceeds a threshold confidence.

In some embodiments, the user interface information for displaying at least a portion of the entities is further based at least in part upon one or more user attributes. The one or more user attributes may comprise a user location.

In some embodiments, the one or more computer processors are further configured to: receive an indication of an event; associate the event with one or more scoring factors; in substantially real-time, update the one or more scoring factors based at least in part upon the event; re-generate scores for at least some of the one or more entities, based upon the updated scoring factors; and generate user interface information for displaying at least a portion of the entities, based at least in part upon the re-generated scores.

In some embodiments, the one or more scoring factors are updated based upon a relationship between an entity attribute and an attribute value associated with the event.

In some embodiments, the user interface information further comprises information for displaying a basis for a change in a score of a displayed entity, based upon the updated scoring factors.

Additional embodiments of the disclosure are described below in reference to the appended claims, which may serve as an additional summary of the disclosure.

In various embodiments, computer-implemented methods are disclosed in which, under control of one or more hardware computing devices configured with specific computer executable instructions, one or more aspects of the above-described embodiments (including one or more aspects of the appended claims) are implemented and/or performed.

In various embodiments, non-transitory computer-readable storage mediums storing software instructions are disclosed, wherein, in response to execution by a computing system having one or more hardware processors, the software instructions configure the computing system to perform operations comprising one or more aspects of the above-described embodiments (including one or more aspects of the appended claims).

Further, as described herein, various embodiments of the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 6B illustrates a user interface that may be used to add additional entities to the displayed entity list.

Figure 1:
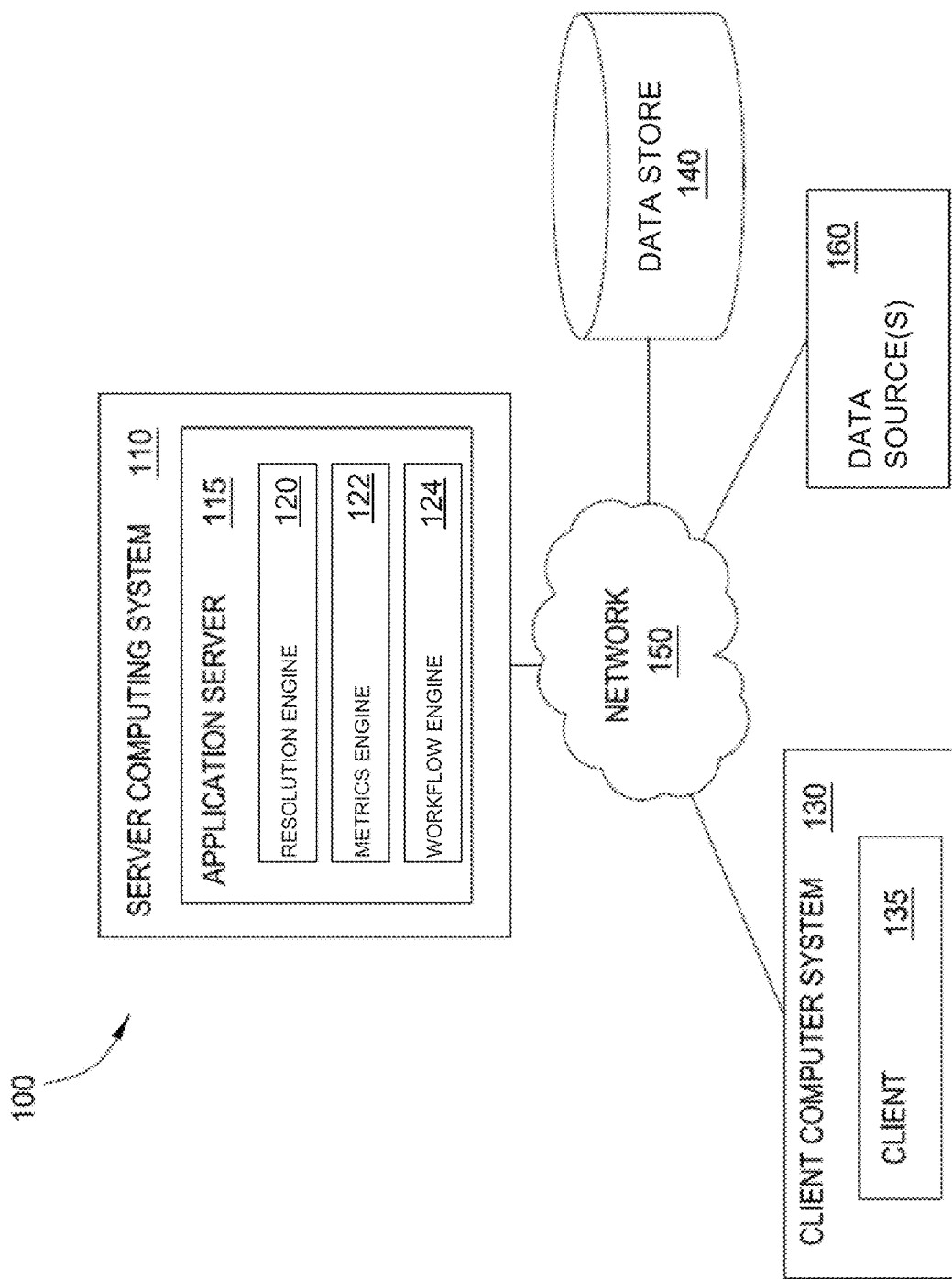
FIG. 1 is a block diagram illustrating an example data analysis system, according to an embodiment.

Throughout the drawings, reference numbers may be reused to indicate correspondence between referenced elements. Nevertheless, use of different numbers does not necessarily indicate a lack of correspondence between elements. And, conversely, reuse of a number does not necessarily indicate that the elements are the same.

DETAILED DESCRIPTION

Definitions

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, mySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Entity: A person, a place, an organization, a market instrument, or other noun.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Overview

Various embodiments of the present disclosure provide improvements to various technologies and technological fields. For example, various aspects of the embodiments can be used to generate holistic entity-centric profiles for individual entities based upon data gathered from multiple different types of data sources, generate user interfaces allowing users to receive information on the most relevant entities, and update entity data in response to current events.

By aggregating different data objects associated with an entity or event into a single aggregated data object corresponding to the entity or event, entity or event data may be better organized for assessing relevant attributes associated with the entity (e.g., in a fraud detection or humanitarian aid context, a risk or need associated with the entity). In some embodiments, the data objects may be aggregated even if there is not complete certainty that the data objects are associated with the same entity or event. On the other hand, in some embodiments, the original underlying data objects may be preserved, such that they can continue to be used for other applications where it may not be appropriate to aggregate and associate the data objects into a single aggregated data object. As such, the usefulness and functionality of the stored data objects may be improved.

In addition, in some embodiments, customized listing of aggregated data objects may be provided to different users, based upon one or more entity or event metrics (e.g., scores) and one or more user attributes. This allows the system to provide to different users listings that will be most relevant to each user. Furthermore, updating entity metrics in response to inputted events may improve the ability of the system to provide users with the most up-to-date and relevant information.

Not necessarily all such advantages can be achieved in accordance with any particular embodiment of the invention. Thus, the invention can be embodied or carried out in a manner that achieves or optimizes one advantage or group of advantages as taught herein without necessarily achieving other advantages as can be taught or suggested herein.

FIG. 1 is a block diagram illustrating an example data analysis system 100, according to an embodiment. As shown in the embodiment of FIG. 1, the data analysis system 100 includes an application server 115 running on a server computing system 110, a client 135 running on a client computer system 130 (also referred to as a user device), and at least one data store 140. Further, the client 135, application server 115, and data store 140 may communicate over a network 150, for example, to access data sources 160.

The application server 115 may include a resolution engine 120, a metrics engine 122, and a workflow engine 124. The resolution engine 120, metrics engine 122, and workflow engine 124 may be software modules as described below in reference to FIGS. 2-8. According to an embodiment, the resolution engine 120 is configured to read data from a variety of data sources 160 to obtain a plurality of different data objects. The accessed data objects from data sources 160 may be of different types. For example, the data objects may include entity data objects, event data objects, and/or the like. The resolution engine 120 may use the retrieved data objects to generate one or more aggregated data objects for one or more entities and/or events. For example, the resolution engine 120 may analyze the retrieved data objects and generate additional metadata associating the data objects with particular entities and/or events. In some embodiments, data generated by the resolution engine may be stored on the server computing system 110 and/or on the data store 140. The operations of the resolution engine 120 are discussed in greater detail below in reference to FIGS. 2-4.

In some embodiments, the metrics engine 122 may be configured to score entities and/or events according to one or more criteria (e.g., risk criteria, need criteria, and/or the like). In some embodiments, the metrics engine 122 may analyze and weigh one or more attributes values or combinations of attributes values associated with an entity (e.g., provided by a holistic entity object generated by the resolution engine 120) or an event.

The application server may further include a workflow engine 124. The workflow engine may generate and/or provide the various user interfaces of the data analysis system. For example, the workflow engine 124 may present various data generated by the resolution engine 120 and/or the metrics engine 122. For example, the workflow engine 124 may present a user with a list of one or more entities, based upon the determined scores associated with the entities. In some embodiments, the workflow engine 124 may be used to generate one or more user interfaces that may be displayed to a user at a client computer system 130 (e.g., as a web service).

The client 135 may represent one or more software applications or modules configured to present data and translate input, from a user, into requests for data analyses by the application server 115. In one embodiment, the client 135 and the application server 115 may be embodied in the same software module and/or may be included in the same computing system. However, several clients 135 may execute on the client computer 130, and/or several clients 135 on several client computers 130 may interact with the application server 115. In some embodiments, client computer 130 may correspond to a personal computer, a laptop, a mobile device (e.g., a mobile phone, tablet, and/or the like), etc.

In one embodiment, the client 135 may be a browser accessing a web service. In various embodiments, a component of the system, for example the workflow engine 124, may generate user interfaces (for example, that may be transmitted to a display or browser and displayed to a user) and/or may generate instructions or code useable to generate a display and/or user interface (for example, that may be transmitted to a display or browser where a user interface may be generated and displayed to a user).

While the client 135 and application server 115 are shown running on distinct computing systems, the client 135 and application server 115 may run on the same computing system. Further, the entity resolution engine 120, the risk engine 122, and/or the workflow engine 124 may run on separate applications servers 115, on separate server computing systems, or some combination thereof.

In an embodiment, the data sources 160 provide data available to the entity resolution engine 120, risk engine 122, and/or workflow engine 124, for example data objects associated with one or more entities or events. Such data sources may include relational data sources, web services data, XML data, and the like. Further, such data sources may include a variety of information and data, for example, entity information, event information, financial information, computer network-related data, and/or computer-related activity data, among others. Data sources 160 is included to be representative of a variety of data available to the server computer system 110 over network 150, as well as locally available data sources.

The data store 140 may be a Relational Database Management System (RDBMS) that stores the data as rows in relational tables. The term "database," as used herein, may refer to a database (e.g., RDBMS or SQL database), or may refer to any other data structure, such as, for example a comma separated values (CSV), extensible markup language (XML), text (TXT) file, flat file, spreadsheet file, and/or any other widely used or proprietary format. While the data store 140 is shown as a distinct computing system, the data store 140 may operate on the same server computing system 110 as the application server 115.

Data Object Resolution

In many applications (e.g., humanitarian aid or fraud detection), it is often beneficial to be able to focus resources on particular entities (e.g., refugees, accounts, etc.) or events (e.g., money laundering) based on a scoring metric, e.g., greatest need, highest risk. For example, in a humanitarian aid context, certain entities (e.g., individuals, families, geographic areas) may be determined to have greater need for aid based upon one or more identified factors. These factors may be based upon attributes associated with the entity, such as previous aid history, demographic information, geographic region, and/or the like. In some embodiments, a score or metric indicating a level of need may be calculated for an entity based upon the factors associated with the entity, allowing a user (e.g., a humanitarian aid worker) to quickly identify which entities are most in need, and be able to allocate resources and attention accordingly.

In order to assess each entity or event based on a scoring metric (e.g., have the highest risk scores, need scores), an aggregated data object aggregating available data and attributes associated with each entity or event may be constructed. In addition, in some embodiments, patterns of events may be identified and used to generate one or more additional attributes. For example, the presence of multiple events within a certain period of time may be used to determine a scoring or ranking for the multiple events or one or more entities associated with the events. However, in many cases, data relating to an entity or event oftentimes may be fragmented and scattered between many different data sources and organized in different ways. In some embodiments, different databases may be maintained by different organizations or departments of an organization. As such, it may often be difficult to determine which data should be associated with which entities or events.

Figure 2:
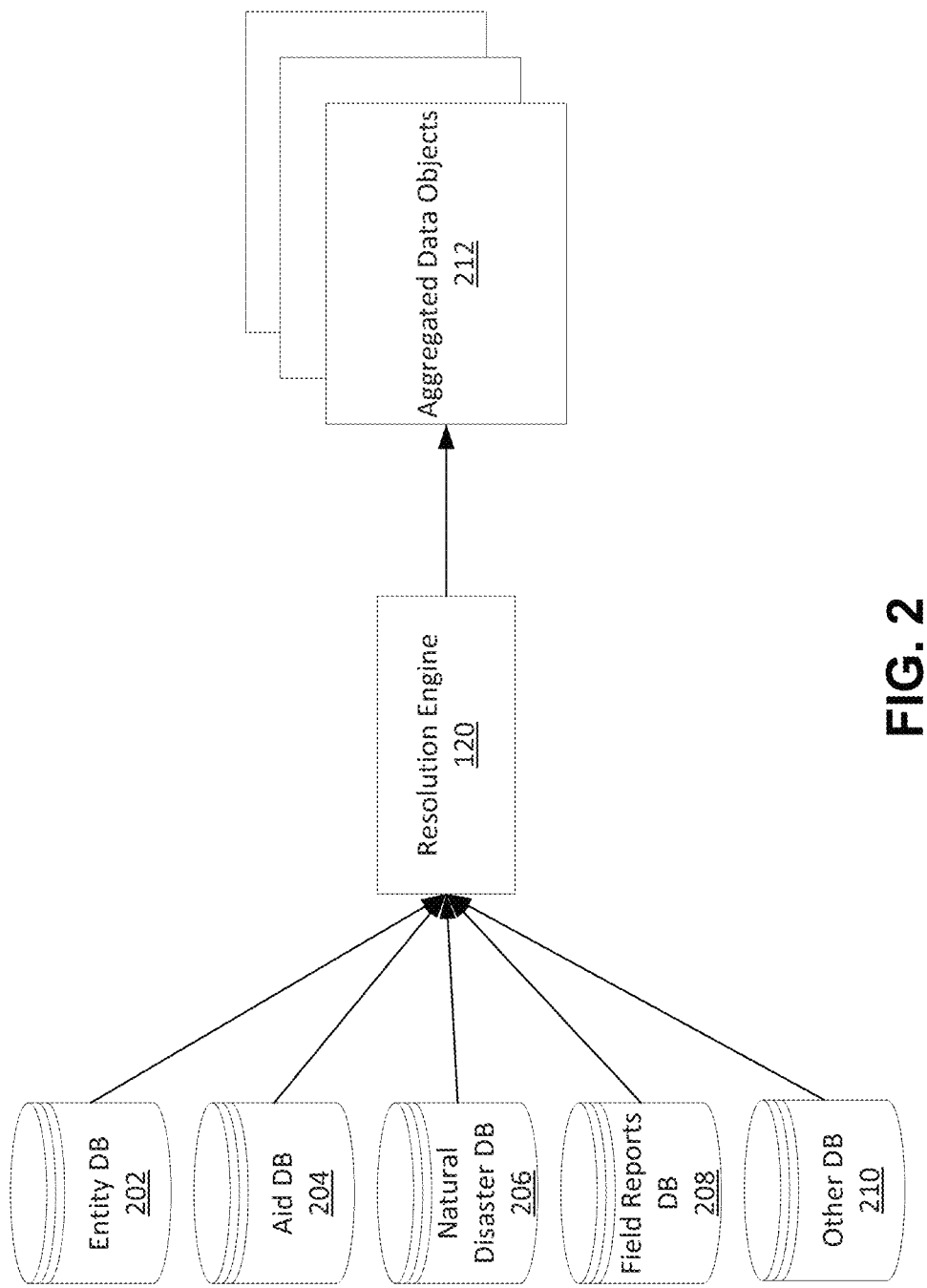
FIG. 2 illustrates a block diagram of various types of data sources that may be used to perform probabilistic entity resolution, in accordance with some embodiments.

FIG. 2 illustrates a block diagram of various types of data sources that may be used to aggregated entity or event data objects, in accordance with some embodiments. In some embodiments, the data sources may include one or more data sources. For example, an entity information data base 202 may contain data objects relating to a plurality of entities. For example, in the context of humanitarian aid, each entity may correspond to an individual, family, group, and/or other entity that may potentially be in need of aid. In a fraud detection context, each entity may correspond to an account, an individual or organization associated with one or more accounts, and/or the like. Each entity in the entity information database may be associated with one or more attributes corresponding to different types of identification information. These may include names, account numbers, known addresses, physical descriptions, associated geographical areas, and/or the like. In some embodiments, an entity of the entity information DB 202 may be associated with values for some but not all types of identification information that may be associated with the entity. For example, a particular entity corresponding to a family in potential need of aid may be associated with one or more physical description attributes, but whose names or address are unknown. In some embodiments, different types of entities may be stored in different data stores.

In some embodiments, the data sources may also include event data sources. In some embodiments, an entity may be associated with one or more event data objects. For example, in a humanitarian aid context, an aid database 204 may contain entries relating to aid events, each entry specifying one or more attributes related to the aid event, such as time of aid, type of aid provided, recipient of aid, cost of aid, and/or the like. As such, an aid event may be associated with one or more entities (e.g., as providers or recipients of aid).

In some embodiments, different types of events may be organized and stored in different data sources. For example, in addition to an aid database 204, a humanitarian aid organization may have access to other databases, such as a natural disaster database 206 comprising information on natural disaster events (e.g., containing attributes such as type of disaster, geographic region affected by disaster, date of disaster, and/or the like), a field report database 208 comprising information on field report event, and/or the like.

In some embodiments, the data sources may also include other types of data sources 210 (e.g., data sources containing data objects relating to other types of entities).

In some embodiments, in order to form an aggregated data object 212 for an entity or event, data from these different sources may be retrieved and aggregated in accordance with a resolution scheme (e.g., at the resolution engine 120). The resolution engine 120 may be configured to identify which data objects from the accessed data sources 202-210 are associated with each entity, as well as determine one or more additional attributes for an entity based upon the data objects associated with the entity. By having the available data for each entity aggregated into a single data object, a score can be calculated for the entities or events based upon their related factors, properties, etc.

In some embodiments, a financial institution (e.g., a bank, a lender, and/or the like) may monitor one or more entities (e.g., individuals or organizations) for fraud, e.g., money laundering. Each entity may be associated with one or more risk factors indicating a likelihood that the entity may have committed fraud (e.g., transfers for unusual amounts of money, transactions with known fraudsters, fraud history, credit history, number of financial accounts owned, and/or the like). Accessed data sources may comprise one or more data sources containing individual or organization data, one or more data sources containing data on a plurality of accounts, one or more data sources containing transaction data, and/or the like.

In another embodiment, one or more of the techniques disclosed herein may be utilized by an insurance agency or underwriter to identify at risk insurance policies. Different entities corresponding to companies or other organizations may be analyzed to determine a risk score, based upon one or more risk factors (e.g., claim history, geographic location, industry, and/or the like). Aggregated data objects may be formed based upon data objects retrieved from a client data store, a claims data store, and/or the like. While the examples disclosed below will refer primarily to certain applications for ease of explanation (e.g., fraud detection context, humanitarian aid context, etc.), it is understood that the techniques disclosed herein may be applied to many other applications.

Probabilistic Object Resolution

As discussed above, a particular entity or an event may be associated with a plurality of different data objects distributed across a plurality of different data stores. For example, an entity object may be associated with a first data object from an entity data store, a second data object from an event data store, and a third data object from another type of data store (e.g., another entity data store).

In addition, in some embodiments, an entity may be associated with multiple data objects from the same data source. For example, a particular entity may be associated with a plurality of different entity objects in a first database. This may occur due to the entity being observed on multiple occasions, without the knowledge that the entities involved with each occasion are actually the same entity. For example, in the context of humanitarian aid and natural disaster relief, there may be multiple reports for entities (e.g., families, neighborhoods, etc.) in need of aid due to a natural disaster that may actually be directed to the same entity. Similarly, in some embodiments, multiple aid agencies or other sources may record events (e.g., natural disaster events) that may actually refer to the same event. In some embodiments, some data objects from a particular data source may not have complete data that may be associated with an entity. For example, a particular entity data object may be associated with a given neighborhood, but not have the street name or address number.

In addition, in some embodiments, a particular entity may be associated with multiple events (e.g., the money launderer/fraudster was described in multiple suspicious activity reports, and/or the like). For example, a fraudster may be associated with multiple suspicious activity report event data objects from a financial fraud database. Similarly, a family or other entity residing in a particular area may be associated with multiple events associated with deployment of humanitarian aid.

In some embodiments, attributes associated with a plurality of different data objects (from the same data source or from different data sources) may be compared, in order to determine whether different data objects can be associated with the same entity or event. In some embodiments, a confidence level is determined, wherein the confidence level indicates whether the data objects should be associated with the same entity. As discussed above, data objects may be associated with one or more attributes that may be used to associate the data object with a particular entity or event. For example, an entity data object may be associated with one or more attributes that may be used to identify the entity (e.g., name, description, identification numbers, and/or the like).

An event data object may be associated with attributes that may be used to identify the event (e.g., time of event, type of event, and/or the like) and/or an entity associated with the event (e.g., an entity that caused the event, participated in the event, was affected by the event, and/or like). In some embodiments, data objects may not always have a complete set of attributes for which to identify an event or entity (e.g., a reporter/personnel recording a field report of an event may have observed a physical description an entity associated with the event, but was unable to record information on other attributes of the entity, such as name or identification numbers).

Attributes associated with the data objects may be compared to determine if different data objects (e.g., corresponding to entities, events, and/or the like) should be associated with the same aggregated data object corresponding to a particular entity or event. In some embodiments, certain types of attributes may be considered a strong indicator of a particular entity or event. For example, if two event data objects are associated with the same location and time, it may be inferred with a high level of confidence that the two event data objects are associated with the same event. On the other hand, certain types of attributes may be considered to be less indicative of a particular entity or event. For example, two data objects sharing the same source may not be considered a strong indicator that the objects should be associated with the same event.

In some embodiments, a confidence level indicating a probability that different objects may be considered to be associated with the same entity or event may be determined, based upon matching attribute data between the data objects. The data objects may be considered to be associated with the same entity or event for the purpose of calculating a score if the confidence level satisfies a threshold confidence level. For example, as discussed above, matching locations may be considered to satisfy the threshold confidence level, while matching sources may not.

In some embodiments, if a confidence level for two or more data objects satisfies the threshold confidence level, the data objects may not be automatically associated with the same entity or event. Instead, a notification may be presented to a user (e.g., at a user interface), prompting the user to confirm that the objects should be associated with the same entity or event.

Figure 3:
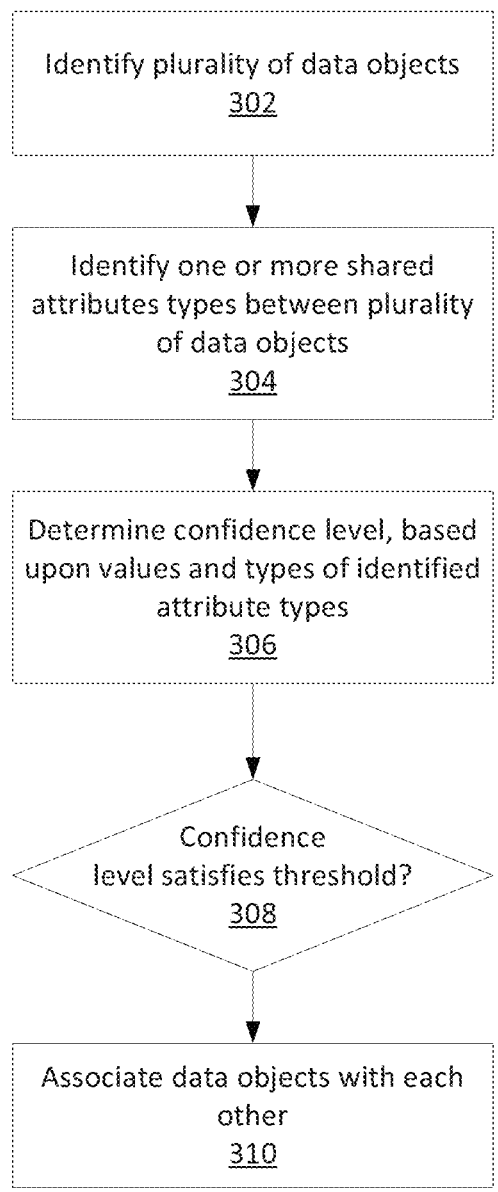
FIG. 3 illustrates a flowchart of a process for associating a plurality of data objects with a single entity, in accordance with some embodiments.

FIG. 3 illustrates a flowchart of a process for associating a plurality of data objects with a single entity or event, in accordance with some embodiments. At block 302, a plurality of data objects is identified. In some embodiments, the data objects may be from different data sources (e.g., an entity object from an entity database and an event object from an events database). In some embodiments, the data objects may be from the same data source (e.g., multiple event objects from an events database).

As discussed above, each data object may be associated with one or more different attributes. At block 304, one or more shared attributes between the identified data objects are identified. For example, it may be determined that a first data object and a second data object are both associated with values for an address attribute. In some embodiments, a pair of data objects may share a plurality of different attributes. For example, in some embodiments, a field report object may be associated with attributes corresponding with information that a humanitarian aid worker is required to record when submitting a field report. As such, different field report objects will tend to be associated with the same attributes.

At block 306, a confidence level is determined, based at least in part upon the attribute types and values of the identified shared attributes. The shared attributes between the data objects may be analyzed to determine whether the values of the shared attributes match. The confidence level may be determined based upon matches and/or mismatches of the identified attribute values.

In addition, as discussed above, different types of attributes may be weighted differently when determining a confidence level. For example, a matching address may be a strong indicator that different data objects should be associated with the same entity, while matching sources, by itself, may be a weak indicator that the data objects should be associated with the same entity. Conversely, an address or source mismatch may both be strong indicators that the data objects are not associated with the same entity or event, while a mismatch in certain other attributes may be a weak indicator that the data objects are not associated with the same entity or event.

At block 308, a determination is made as to whether to confidence level satisfies a threshold level. If so, the process may proceed to block 310, where the identified data objects are associated with the same entity or event. In some embodiments, instead of automatically associating the data objects with the same entity or event in response to the confidence level satisfying a threshold, a notification may be displayed to a user at a user interface, prompting the user to manually determine whether the data objects should be associated with the same entity. In addition, a basis for determining the confidence level (e.g., matching attribute types) may be displayed.

In some embodiments, the data objects may be automatically associated with the same entity or event if the confidence level satisfies a first threshold level, while being presented to a user for confirmation if the confidence level satisfies a second threshold level lower than the first threshold level. For example, in some embodiments, data objects associated with a common value for a first attribute may be automatically determined to be associated with the same entity or event, while data objects associated with a common value for a second, different attribute may require manual confirmation by a user. In some embodiments, determining which data objects should be associated with the same entity/event allows for more complete information to be obtained for the entity/event, which may be used to calculate one or more scores associated with the entity or event (e.g., risk score, need score, and/or the like).

In some embodiments, because data objects may not always be associated with entities with complete certainty, probabilistic or "soft" resolution may be used to associate retrieved data objects with entities or events without modifying the underlying data objects or data sources. For example, while it may be acceptable for the data from two different data objects to associated with the same entity or event for the purpose of calculating a score for the entity or event, it may not be appropriate for the data objects to be combined in the source/original data store, due to uncertainty that the data objects actually correspond to the same entity or event.

Through the use of soft resolution, the functionality and usability of the system may be improved. By aggregating and associating different data objects with entities or events for certain applications (e.g., determining one or more scores, such as risk scores, need scores, and/or the like), a greater amount of data may be obtained, allowing for more accurate results (e.g., in determining scores for an entity or event). On the other hand, preserving the original data objects preserved for use in other applications where it may not be appropriate to aggregate the data objects.

Figure 4:
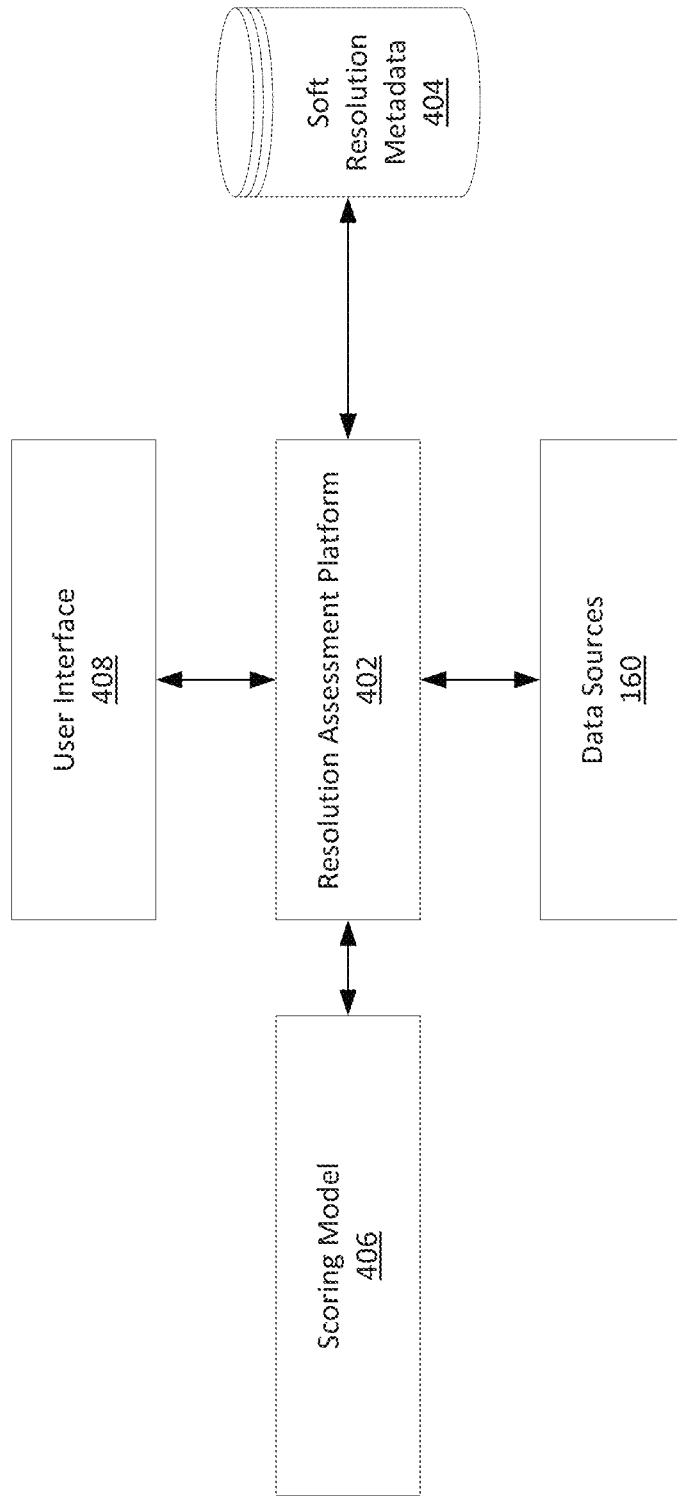
FIG. 4 illustrates a block diagram of a system for performing probabilistic entity resolution on data objects from a plurality of data sources, and assessing scores or other relevant factors of the entities, in accordance with some embodiments

FIG. 4 illustrates a block diagram of a system for performing soft resolution on data objects from a plurality of data sources, and assessing scores of the entity or event resolutions, in accordance with some embodiments. As illustrated in FIG. 4, a resolution assessment platform 402 may access a plurality of data sources 160. In some embodiments, the resolution assessment platform 402 is implemented by the resolution engine 120, metrics engine 122, or some combination thereof.

The data sources 160 may comprise entity data sources, event data sources, or other types of data sources. For example, in some embodiments, the data sources 160 may comprise one or more data sources as illustrated in FIG. 2 (e.g., entity database 202, aid database 204, natural disaster database 206, field reports database 208, and/or other databases 210).

Retrieved data objects from the plurality of data sources 160 may be processed using soft resolution, in order to determine which data objects should be associated with which entities or events for the purpose of assessing scores associated with the entities or events. In some embodiments, attribute types associated with the retrieved data objects may be compared to determining matching attribute types between pairs of data objects, from which a confidence level may be calculated. Pairs of data objects associated with a confidence value satisfying one or more confidence thresholds may be determined to be associated with the same entity or event (e.g., automatically or through manual user confirmation).

In some embodiments, soft resolution may comprise generating metadata to be associated with the retrieved data objects, wherein the metadata indicates which entities or events are associated with which data objects. As illustrated in FIG. 4, the soft resolution metadata 404 may be stored separately from the one or more data sources 160, such that the underlying data objects of the data sources 160 remain unchanged.

In some embodiments, the soft resolution metadata 404 may be used to form one or more aggregated entity or event data objects, wherein all available data associated with the entity or event is aggregated. In some embodiments, an aggregated data object may be constructed by accessing the soft resolution metadata 404 to determine which data objects are associated with the entity or event. The data associated with the data objects may be combined or aggregated to determine attribute values associated with the entity or event. For example, an entity may be associated with a first entity data object having values for birthday first set of attributes, and a second entity data object having values a second, different set of attributes, a first event data object corresponding to an event that the entity is associated with, and/or the like. In some embodiments, one or more aggregate attributes for the entity or event may be determined based upon the data objects associated with the entity or event. For example, a particular entity may be associated with a plurality of event data objects, which may be used to determine an event history for the entity, as well as one or more additional attributes based upon the determined event history (e.g., time between events, type of association with events, and/or the like). In another embodiment, a particular event may be associated with the plurality of entity data objects, which can be used to determine one or more aggregate attributes associated with the event (e.g., number of entities associated with event, types of entities associated with event, and/or the like).

In some embodiments, an entity may be associated with one or more affiliations (e.g., group affiliations). For example, an entity may be associated with an address or location associated with a particular group (e.g., a country, company, or other organization), may be identified in a field report data object as having been observed certain attributes associated with a group, may be associated with other entities believed to be affiliated with the group, and/or the like. In some embodiments, an affiliation score may be determined for an entity indicating a likelihood that the entity has a certain affiliation. In some embodiments, the calculated additional attributes for the entity may be stored as part of the soft entity resolution metadata 404 or in another data store (not shown).

In some embodiments, how additional attributes such as affiliation are determined may be updated by one or more users. For example, a fraud detection officer tasked with detecting and analyzing possible instances of money laundering may observe different types of indicators for identifying affiliations between two or more different entities. As a result, how affiliation is determined for the entities may be updated based upon the knowledge of the officer.

Scoring Model

In some embodiments, once an aggregated data object for an entity or event is created, a score may be calculated for the entity or event, indicating an applicability of the entity or event to a certain parameter. For example, in the context of fraud detection, a score for an entity may indicate a risk that the entity will commit fraud during a future time period. In the context of humanitarian aid, a score for an entity may indicate a level of need of the entity. In some embodiments, the score may be determined using a scoring model 406. In some embodiments, an entity may be associated with more than one score, each score being associated with a different type of parameter.

In some embodiments, the scoring model 406 extracts one or more attributes associated with an aggregated data object. The one or more attributes (also referred to as scoring factors) may correspond to attributes associated with an entity believed to be indicative of the parameter associated with the score (e.g., risk, need, etc.). These may include attributes related to a current status of the entity (e.g., geographic location of the entity, financial status of the entity, and/or the like), an event history associated with the entity (types of event associated with the entity, time since most recent event, time between events, and/or the like), and/or the like. The model may weigh the extracted attributes to make a determination of the score associated with the entity.

In some embodiments, one or more extracted attributes may be combined or aggregated to form an aggregated attribute to be used by the model. For example, in some embodiments, the scoring model may weigh a first attribute differently based upon a value of a second attribute.

In some embodiments, the scoring model 406 may utilize machine learning to determine scoring factors to extract and how the extracted scoring factors should be weighed in determining a score to be associated with the entity or event. In some embodiments, the models must first be trained before they can be used to determine scores to be associated with entities or events. For example, sample training data may be received by the model. The sample training data may comprise data associated with one or more entities or events from which one or more scoring factors may be extracted. The sample training data is processed by the model to determine scores for the one or more entities or events.

The results produced by the model can then be compared with one or more expected results, and a determination is made as to whether the model results are satisfactory. If the results are not satisfactory, the model may be updated based upon the comparison between the model results and the expected results. For example, in some embodiments, the weights afforded to certain extracted scoring factors may be altered, based upon how indicative they are of the parameter associated with the score.

In addition to training data, the model may continue to be updated during use. For example, as additional data is received for analyzed entities or events, the model may be further updated and improved, e.g., based upon the reported accuracy/inaccuracy of the model. For example, in the context of fraud detection, if it is determined that a particular entity has committed fraud, the attributes associated with the entity may be analyzed to determine one or more updates to the scoring model for calculating a score.

After scores have been calculated for one or more entities or events, a listing of entities or events may be displayed to a user at a user interface 408. The listing may be based upon the calculated scores (e.g., the listing may comprise entities having the highest scores). In some embodiments, a user may use the user interface 408 to modify the displayed listing of entities (e.g., add or remove entities from the listing), combine listed entities, bookmark listed entities, and/or other operations. Operations that may be performed using the user interface 408 will be described in greater detail below, in association with FIGS. 6-7.

Risk Determination Process

Figure 5:
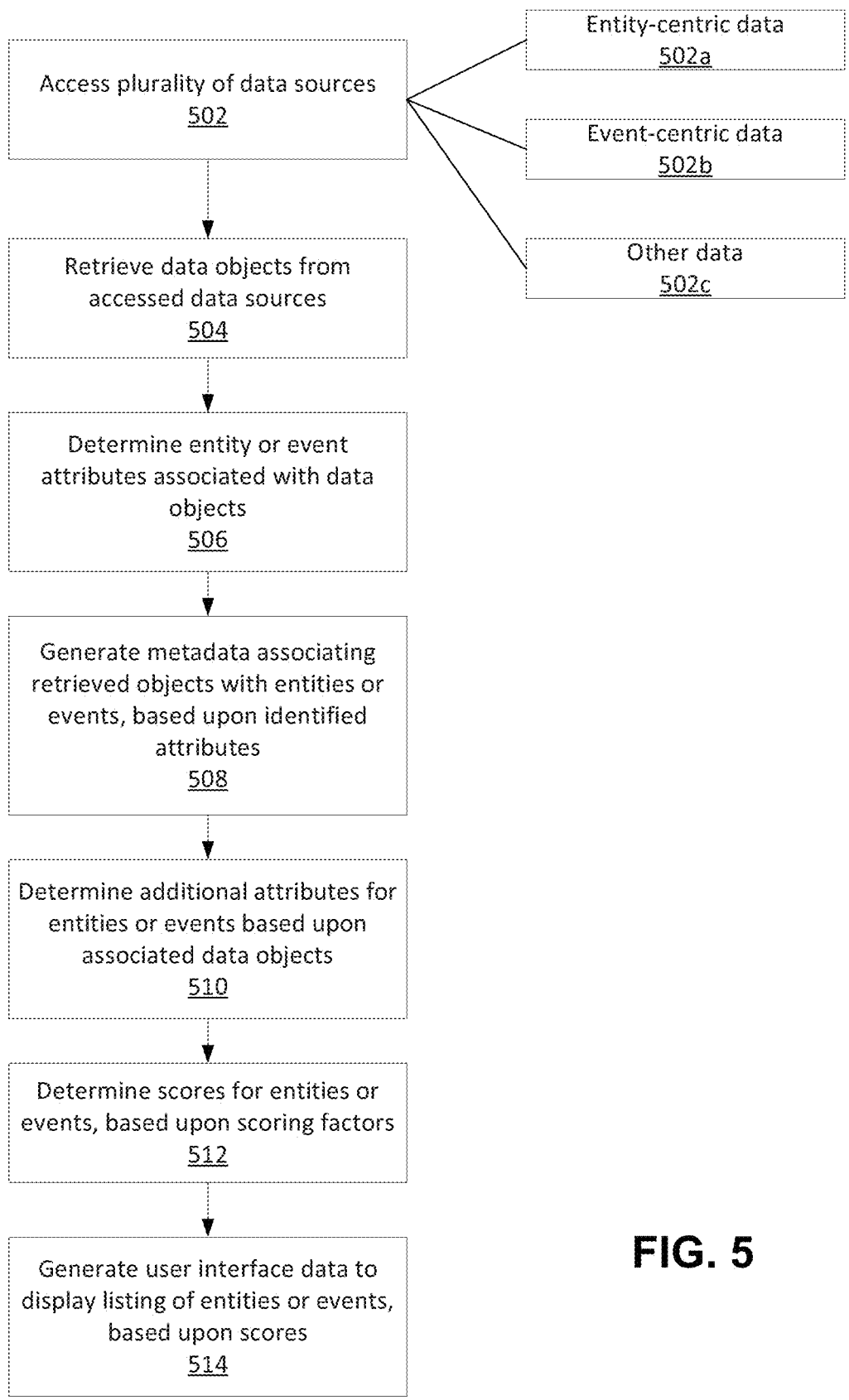
FIG. 5 illustrates a flowchart of a process for performing entity resolution and determining scores for entities, in accordance with some embodiments.

FIG. 5 illustrates a flowchart of a process for performing resolution and determining scores for aggregated data objects, in accordance with some embodiments. At block 502, a plurality of data sources is accessed. As discussed above, the plurality of data sources may include one or more entity data sources 502a, one or more event data sources 502b, and one or more other types of data sources 502c (e.g., data sources directed to other types of entities). At block 504, data objects are retrieved from the accessed data stores.

At block 506, attributes that may be used to identify an entity or event associated with the retrieved data objects are identified. For example, the attributes for identifying an event may comprise time and date attributes. In some embodiments, attributes for identifying an entity may comprise description attributes, associated location attributes, type attributes, title attributes, and/or the like.

At block 508, metadata is generated to associate retrieved data objects with entities or events, based at least in part upon the identified attributes. In some embodiments, identified attributes of different data objects may be compared and used to generate a confidence value that the data objects should be associated with the same entity or event. The attributes may be weighed based upon a type of attribute (e.g., certain types of attributes may be considered more indicative for identifying an entity or event) and whether the values of the attribute match between the different data objects. In some embodiments, if the confidence value meets a confidence threshold, the data objects may be automatically associated with the same entity or event.

In some embodiments, the generated metadata may be stored separately from the underlying data objects retrieved from the plurality of data stores. As such, the underlying data objects will remain unchanged.

At block 510, one or more additional attributes may be determined for each entity or event, based upon the data objects associated with the entity or event. For example, event data objects associated with an entity may be used to determine an event history associated with the entity, as well as one or more attribute values that may derived from the event history (e.g., number of events, time between events, time since most recent events, and/or the like). For example, in a fraud detection context, an entity associated with an account or account owner may be associated with multiple transaction events, which may be used to determine a transaction history associated with the entity, as well as one or more attributes associated with the transaction history (e.g., number of transactions, time between transactions, amount of transactions, and/or the like). In some embodiments, different attributes from different data objects may be used to determine a relationship of the entity or event. For example, a particular entity may be determined as being associated with a group or organization.

At block 512, a score is determined for each aggregated data object corresponding to a particular entity or event, based at least in part upon one or more scoring factors. The one or more scoring factors correspond to at least a portion of the attributes or combinations of attributes associated with the entity or event. In some embodiments, the score may be calculated using a scoring model, based upon the risk factors associated with the entity or event.

At block 514, a listing of one or more entities or events may be displayed to a user via a user interface at a user device. For example, a listing of entities or events having the highest scores may be displayed. In some embodiments, the entities displayed may be based at least in part upon one or more attributes of the user (e.g., user location, user department, user interests, and/or the like). The user may be able to modifying the listing by adding or removing entities or events from the list.

In some embodiments, a user may select a particular entity or event to view an aggregated data object for the entity or event. The aggregated data object may display data on attributes that would be useful to the user in dealing with the entity or event (e.g., photos, description, addresses). The aggregated data object may also display one or more attributes used in generating the score for the entity or event (e.g., most relevant scoring factors).

User Interface

Figure 6A:
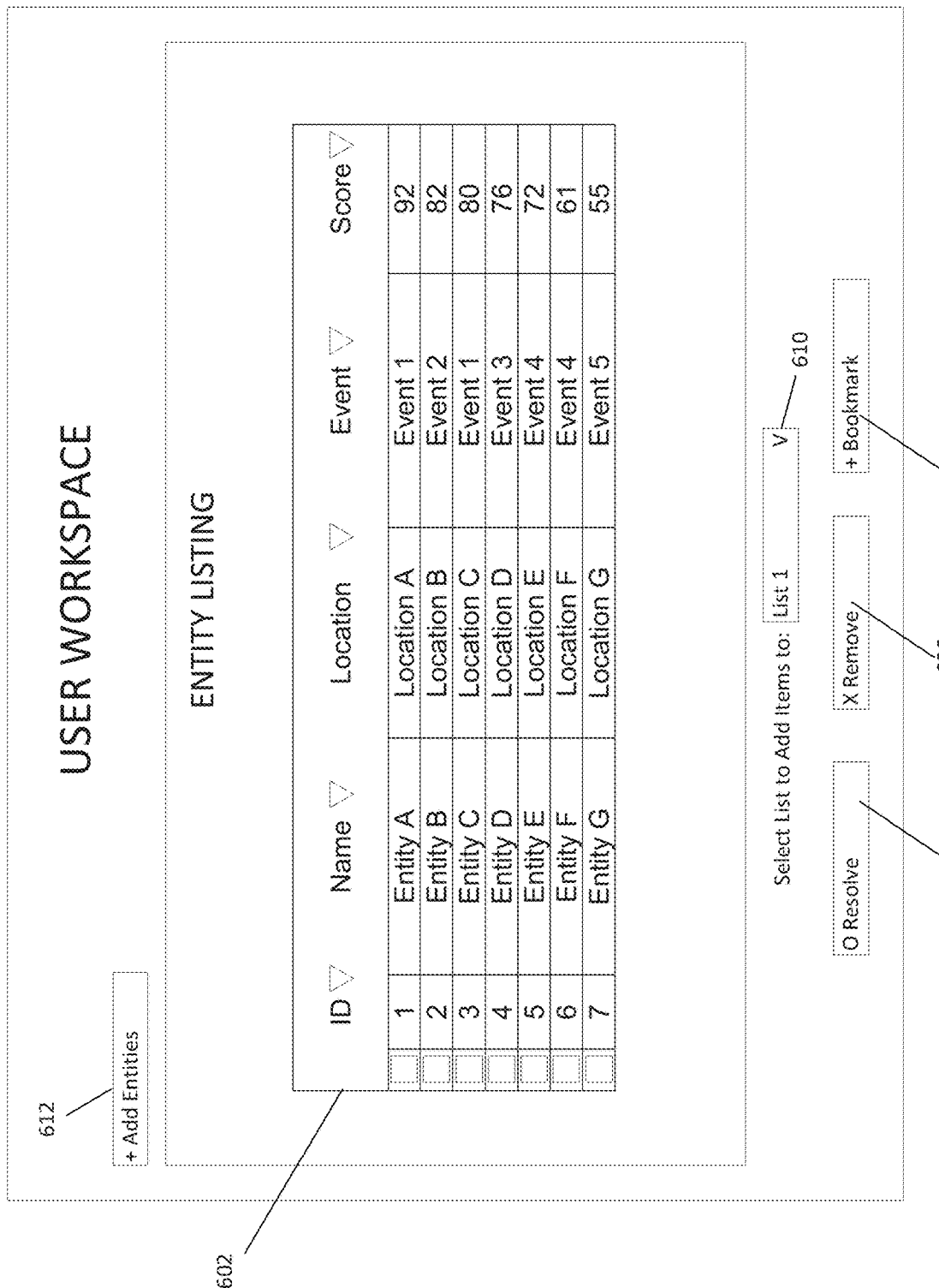
FIG. 6A illustrates an example user interfaces that may be generated to display entities and their associated scores.

FIGS. 6A and 6B illustrate example user interfaces that may be generated to display entities and/or events and their associated scores. In some embodiments, the user interface may display to a user a listing of entities 602 in descending order of scores. It is understood that although FIGS. 6A and 6B illustrate a listing of entities, in other embodiments, user interfaces may be generated to display events instead of entities, or some combination thereof. Displayed data for each entity may include title attributes of the entity such as an ID corresponding to the entity or a name of the entity, one or more additional attributes associated with the entity (e.g., a location associated with the entity, a most recent event associated with the entity), and the calculated score for the entity.

In some embodiments, the user may select a particular entity to view more detailed information on the selected entity. In some embodiments, the additional information for the entity may be retrieved using an aggregated data object associated with the entity. In some embodiments, the user may print out the additional information retrieved using the aggregated data object for the entity, for use when the user may not have access to a user device.

In some embodiments, the user may, when viewing the entity listing, believe that two or more entities in the listing actually refer to the same entity. As such, the user may select the desired entities and select the "Resolve" button 604 to combine the selected entities. In response, the data objects associated with each of the selected entities will be associated with a single aggregated data object. In addition, any additional attributes (e.g., history attributes, affiliation attributes, and/or the like) may be recalculated. In some embodiments, an updated score will also be calculated for the entity.

In some embodiments, the user may also modify the entities displayed in the listing. For example, the user may select the "Remove" button 606 to remove one or more selected entities from the listing. For example, the user may, using their own knowledge, determine that a particular entity is not relevant and thus select the entity for removal.

In some embodiments, the user may bookmark one or more of the listed entities (e.g., by selecting one or more entities and selecting the "Bookmark" button 608). As such, the user is able maintain a customized list of entities, even as the listing reflecting the entities with the highest scores changes. In some embodiments, the user may maintain multiple different lists of bookmarks (e.g., different lists associated with different locations, different types of events, and/or the like). A user interface element, such as a pull-down menu 610 may be used by the user to select a list for the selected entities to be added to.

In some embodiments, the user may be interested in certain entities that are not part of the displayed listing (e.g., due to their calculated scores being lower than the listed entities). As such, the user may desire to add one or more additional entities to the displayed listing (e.g., by selecting an "add entities" button 612).

FIG. 6B illustrates a user interface that may be used to add additional entities to the displayed entity list. As illustrated in FIG. 6B, an additional display panel allowing the user to search available entities is displayed (e.g., in response to the user selecting the "add" button 612). The user may search for one or more keywords relating to a desired data object (e.g., using search field 614) and receive a listing of search results 616. The user may select one or more entities 618 from the search results 616 to be added to the listing 602.

In some embodiments, the entities displayed to the user (e.g., listing 602) may be based at least in part upon one or more attributes of the user. For example, the user may be associated with a particular geographic area and/or a particular organization. As such, the listing 602 may be limited to entities associated with the geographic area, are relevant to the organization, etc. In some embodiments, the attributes of the user may be detected automatically. In some embodiments, the user may input one or more preferences (e.g., only list entities or events associated with certain locations, having certain attributes, and/or the like).

Figure 7:
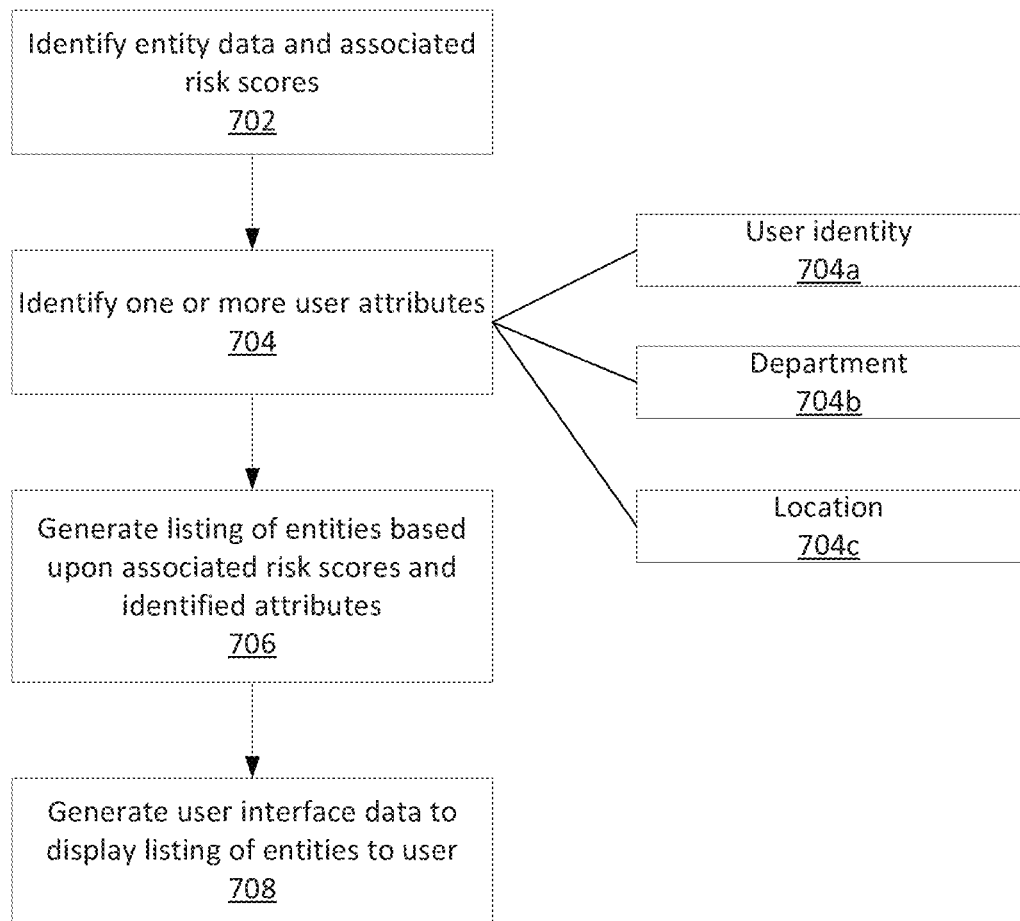
FIG. 7 illustrates a flowchart of a process for displaying a listing of entities to a user at a user interface, in accordance with some embodiments.

FIG. 7 illustrates a flowchart of a process for displaying a listing of entities to a user at a user interface, in accordance with some embodiments. At block 702, entity or event data and associated scores are identified. In some embodiments, the entity or event data may comprise all entity/event data, entity/event data corresponding to entities associated with a score above a threshold value, and/or the like.

At block 704, one or more attributes associated with the user are identified. These may include one or more attributes related to an identify of the user 704a, one or more attributes related to an organization associated with the user 704b, one or more attributes related to a location of the user 704c, and/or the like. In some embodiments, the one or more attributes may be determined automatically based upon a user profile of the user, one or more user-inputted credentials, and/or the like.

At block 706, a listing of entities/events is generated based upon the scores associated with the entities/events, and the identified user attributes. This may be done is order to present a listing of entities/events that will be most relevant to the user. For example, in some embodiments, a user may be associated with a location or region. Entities/events associated with locations that are in proximity to the location or region associated with the user may be more relevant to the user. As such, the listing of entities may be based upon the locations associated with the entities/events relative to the location associated with the user. For example, in some embodiments, entities/events having an associated location greater than a threshold distance from the location associated with the user may be excluded from the listing.

In some embodiments, the user may be associated with a particular organization. For example, a fraud detection officer may be associated with an organization that specializes in handling particular types of fraud (e.g., money laundering, insider trading, and/or the like). As such, entity listings generated for different users may be customized based upon the organization associated with the users (e.g., a listing generated for a user in the money laundering organization will contain entities or events associated with money laundering, while a listing generated for a user in the insider trading organization will contain entities or events associated with insider trading).

In some embodiments, other types of user attributes may be used to determine how the listing of entities or events is generated. In addition, in some embodiments the user may input one or more preferences for generating the listing. For example, the user may specify one or more additional criteria for which to generate the listing.

In some embodiments, one or more rules specifying which entities or events will be included in the listing may be generated. For example, in some embodiments, if a score for a particular entity is sufficiently high, the entity may be included in the listing for a particular user, even if the entity does not have attributes corresponding to the user (e.g., location, organization, and/or the like).

At block 708, user interface data is generated to display the listing of entities or events to the user at a user interface. As such, functionality of the system may be improved, as each user receives a listing of entities or events that is most relevant to them, based upon their attributes and/or preferences.

Event-Based Scoring Model

In some embodiments, events may change how a score is determined for certain entities, even if the attributes of the entities do not change. In some embodiments, the occurrence of a first event may increase the score of certain entities. In some embodiments, a first event may comprise an event involving a first set entities. In response, it may be expected that a second event will occur in the near-future. As a result, the scoring model (e.g., for calculating a score indicating a likelihood that the entity may be involved in an event) may be adjusted such that the first set of entities or other entities associated with the first set of entities will have a higher score. Thus, in some embodiments, a determined score associated with an entity may increase in response to an occurrence of an event, even if none of the attributes values associated with the entity have changed. In addition, the score associated with the entity may be adjusted even if the entity is not a participant of an event or otherwise directly associated with the event.

In another example, in the context of fraud monitoring, certain events may cause the risk scores associated with some entities to change. For example, an event corresponding to a large drop in the stock market may cause the scores for certain types of entities (e.g., entities with net assets below a certain value, entities with a certain amount of money invested in stocks, and/or the like) to increase or decrease, despite none of the attributes associated with the entities changing.

Figure 8:
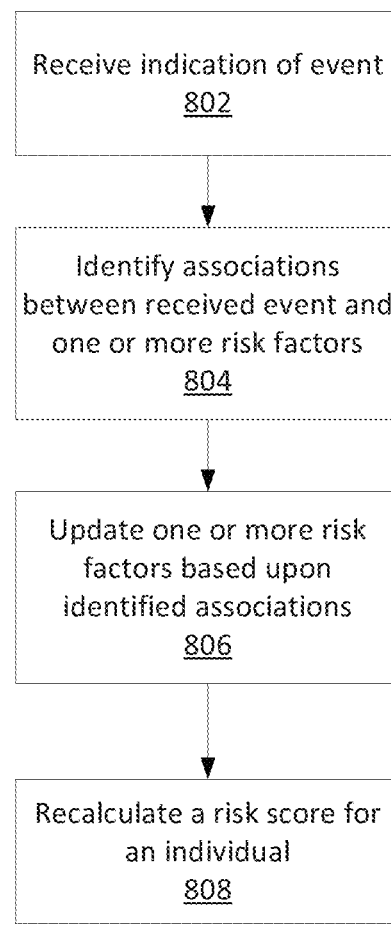
FIG. 8 illustrates a flowchart of a process for updating scores in response to inputted events, in accordance with some embodiments.

FIG. 8 illustrates a flowchart of a process for updating scores in response to events, in accordance with some embodiments. At block 802, an indication of an event may be received. In some embodiments, the indication of an event may be received as a new data object from an event data source (e.g., a field reports database, a calendar database, and/or the like). In some embodiments, the indication of the event may be received through another source. For example, an indication of a field report event may be received as field reports are received, instead of being retrieved from a field report data store.

At block 804, associations between the event and one or more scoring factors are identified. In some embodiments, the event may be associated with one or more different attributes (e.g., type of event, location of event, entities involved in the event, and/or the like) that may be associated with one or more scoring factors. In some embodiments, events of certain types may cause the weights of certain scoring factors to change. For example, an event of a certain type may cause the scores of entities associated with a location within a certain proximity of the event location to change (e.g., a natural disaster event may cause the need scores for entities associated with locations within a certain proximity to the event to rise).

At block 806, the one or more scoring factors are updated, based at least in part upon the identified associations. In some embodiments, weights associated with certain scoring factors may increase or decrease based upon attributes associated with the event. For example, as discussed above, a weight associated with an entity having certain attributes may be increased or decreased in response to the occurrence of the event, based upon a relationship or association with an entity associated with the event (e.g., a participant at the event), a location associated with the event, and/or the like. In some embodiments, the one or more scoring factors may comprise a combination of different scoring factors (e.g., scores may be increased for entities having a membership with certain organizations and associated with a location within a threshold distance of the location of the event, while scores for entities outside the threshold distance may remain unchanged, regardless of membership).

At block 808, scores for one or more entities are recalculated, based upon the one or more updated scoring factors. In addition, the updated scores may be propagated to a plurality of user devices, causing updates to one or more user interfaces to reflect the changed scores. For example, a user at a user device may receive an alert of the event and an updated entity listing based upon the event. As such, the user may receive updated scoring information in substantially real-time in response to events. By updating scores in substantially real-time in response to events, users can be kept up to date on the latest conditions, allowing them to allocate attention and resources accordingly. In some embodiments, entities having updated scores in the displayed listing may be highlighted or displayed with some other visual affect (e.g., up/down arrows indicating that a score for an entity has gone up or down), allowing the user to quickly determine which of the displayed entities were affected by the event.

In some embodiments, the user may also receive an indication of a basis for the updated score information. For example, an indication of a basis for an updated score due to an event may be displayed next to an updated score for a particular entity (e.g., an indication of the event, an indication of one or more scoring factors associated with the update, and/or the like). In some embodiments, the user may select a particular entity having an updated score due to the event, in order to view a display containing a basis for the updated score (e.g., a listing of the updated scoring factors used to update the score, a listing of the most relevant scoring factors used to update the score, and/or the like).

In some embodiments, scores for entities may continue to be updated in response to the occurrence of the event. For example, in some embodiments, the updated weights of certain factors may continue to be adjusted as time passes after the occurrence of the event. In some embodiments, changes to the weights of certain factors may be reverted after a threshold period of time has passed following the event.

Data Item-Centric Data Model

To provide a framework for the description of specific systems and methods provided above and below, an example database system 1210 using an ontology 1205 will now be described in reference to FIGS. 9A-9C. This description is provided for the purpose of providing an example and is not intended to limit the techniques to the example data model, the example database system, or the example database system's use of an ontology to represent information.

In one embodiment, a body of data is conceptually structured according to data item-centric data model represented by ontology 1205. The conceptual data model is independent of any particular database used for durably storing one or more database(s) 1209 based on the ontology 1205. For example, each object of the conceptual data model may correspond to one or more rows in a relational database or an entry in Lightweight Directory Access Protocol (LDAP) database, or any combination of one or more databases.

Figure 9A:
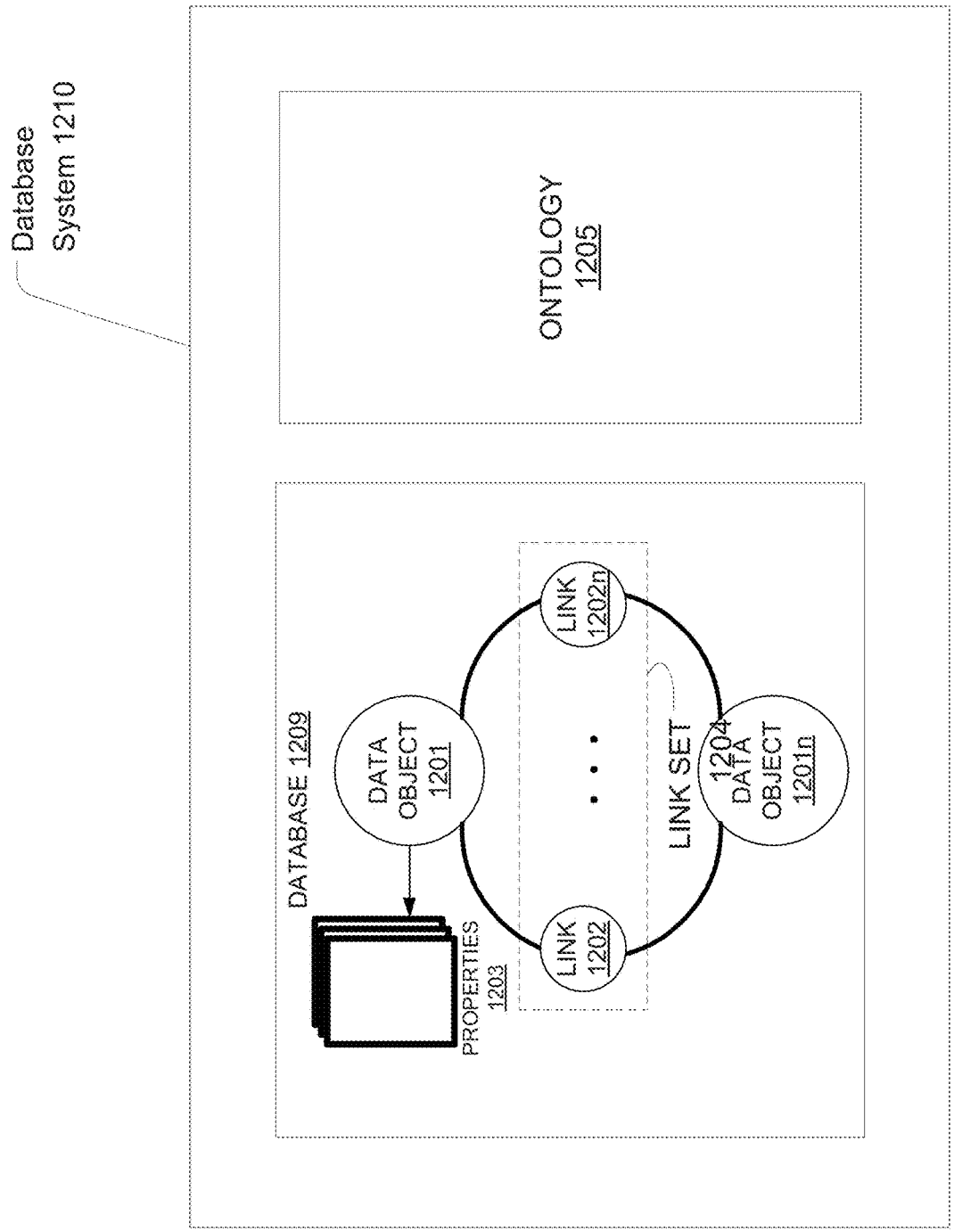
FIG. 9A illustrates an embodiment of a database system using an ontology.

FIG. 9A illustrates data item-centric conceptual data model (which may also be referred to as an "object-centric conceptual data model") according to an embodiment. An ontology 1205, as noted above, may include stored information providing a data model for storage of data in the database 1209. The ontology 1205 may be defined by one or more data item types (which may also be referred to as "object types"), which may each be associated with one or more property types. At the highest level of abstraction, data item 1201 (which may also be referred to as a "data object" or "object") is a container for information representing things in the world. For example, data item 1201 can represent an entity such as a person, a place, an organization, a market instrument, or other noun. Data item 1201 can represent an event that happens at a point in time or for a duration. Data item 1201 can represent a document or other unstructured data source such as a file (for example, a malware file), an email message, a news report, or a written paper or article. Each data item 1201 is associated with a unique identifier that uniquely identifies the data item within the database system.

Different types of data items may have different property types. For example, a "file" data item (as described above) may have various property types as described above (for example, various hash property types, associated file property types, various external analysis property types, and/or the like), a "Person" data item may have an "Eye Color" property type, and an "Event" data item may have a "Date" property type. Each property 1203 as represented by data in the database system 1210 may have a property type defined by the ontology 1205 used by the database 1205. Properties of data items may, in an embodiment, themselves be data items and/or associated with data items. For example, file data items may be associated with various analysis information items, as described above. Analysis information items may comprise data items and/or properties associated with data items (for example, file data items).

Items may be instantiated in the database 1209 in accordance with the corresponding data item definition for the particular data item in the ontology 1205. For example, a specific monetary payment (e.g., an item of type "event") of US$30.00 (e.g., a property of type "currency") taking place on Mar. 27, 2009 (e.g., a property of type "date") may be stored in the database 1209 as an event data item with associated currency and date properties as defined within the ontology 1205.

The data objects defined in the ontology 1205 may support property multiplicity. In particular, a data item 1201 may be allowed to have more than one property 1203 of the same property type. For example, a "Person" data item may have multiple "Address" properties or multiple "Name" properties.

Each link 1202 represents a connection between two data items 1201. In one embodiment, the connection is either through a relationship, an event, or through matching properties. A relationship connection may be asymmetrical or symmetrical. For example, "Person" data item A may be connected to "Person" data item B by a "Child Of" relationship (where "Person" data item B has an asymmetric "Parent Of" relationship to "Person" data item A), a "Kin Of" symmetric relationship to "Person" data item C, and an asymmetric "Member Of" relationship to "Organization" data item X. The type of relationship between two data items may vary depending on the types of the data items. For example, "Person" data item A may have an "Appears In" relationship with "Document" data item Y or have a "Participate In" relationship with "Event" data item E. As an example of an event connection, two "Person" data items may be connected by an "Airline Flight" data item representing a particular airline flight if they traveled together on that flight, or by a "Meeting" data item representing a particular meeting if they both attended that meeting. In one embodiment, when two data items are connected by an event, they are also connected by relationships, in which each data item has a specific relationship to the event, such as, for example, an "Appears In" relationship.

As an example of a matching properties connection, two "Person" data items representing a brother and a sister, may both have an "Address" property that indicates where they live. If the brother and the sister live in the same home, then their "Address" properties likely contain similar, if not identical property values. In one embodiment, a link between two data items may be established based on similar or matching properties (e.g., property types and/or property values) of the data items. These are just some examples of the types of connections that may be represented by a link and other types of connections may be represented; embodiments are not limited to any particular types of connections between data items. For example, a document might contain references to two different items. For example, a document may contain a reference to a payment (one item), and a person (a second item). A link between these two items may represent a connection between these two entities through their co-occurrence within the same document.

Each data item 1201 may have multiple links with another data item 1201 to form a link set 1204. For example, two "Person" data items representing a husband and a wife could be linked through a "Spouse Of" relationship, a matching "Address" property, and one or more matching "Event" properties (e.g., a wedding). Each link 1202 as represented by data in a database may have a link type defined by the database ontology used by the database.

Figure 9B:
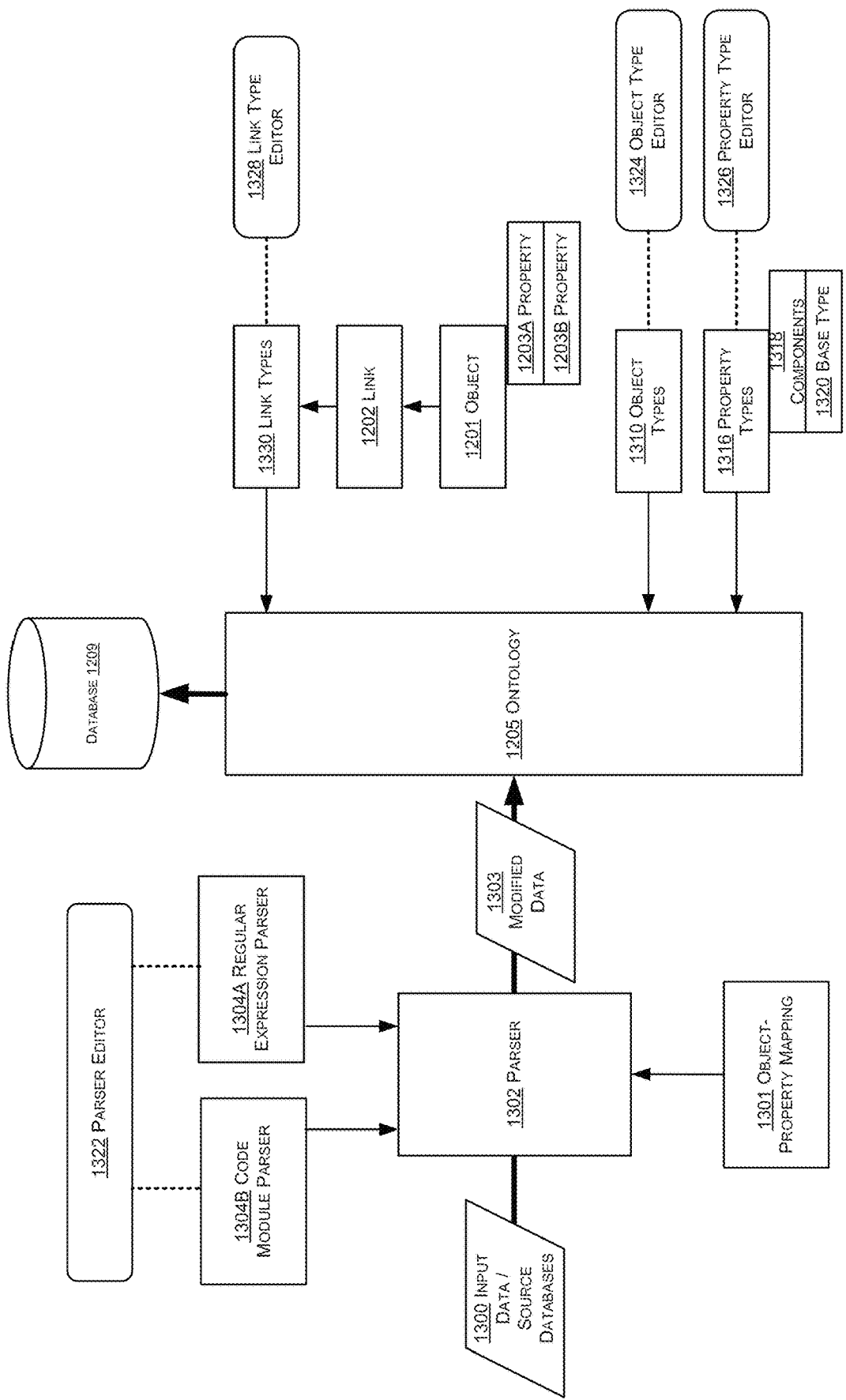
FIG. 9B illustrates an embodiment of a system for creating data in a data store using a dynamic ontology.

FIG. 9B is a block diagram illustrating example components and data that may be used in identifying and storing data according to an ontology. In this example, the ontology may be configured, and data in the data model populated, by a system of parsers and ontology configuration tools. In the embodiment of FIG. 9B, input data 1300 is provided to parser 1302. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 1302 is able to read a variety of source input data types and determine which type of data it is reading.

In accordance with the discussion above, the example ontology 1205 comprises stored information providing the data model of data stored in database 1209, and the ontology is defined by one or more data item types 1310, one or more property types 1316, and one or more link types 1330. Based on information determined by the parser 1302 or other mapping of source input information to item type, one or more data items 1201 may be instantiated in the database 209 based on respective determined item types 1310, and each of the items 1201 has one or more properties 1203 that are instantiated based on property types 1316. Two data items 1201 may be connected by one or more links 1202 that may be instantiated based on link types 1330. The property types 1316 each may comprise one or more data types 1318, such as a string, number, etc. Property types 1316 may be instantiated based on a base property type 1320. For example, a base property type 1320 may be "Locations" and a property type 1316 may be "Home."

In an embodiment, a user of the system uses an item type editor 1324 to create and/or modify the item types 1310 and define attributes of the item types. In an embodiment, a user of the system uses a property type editor 1326 to create and/or modify the property types 1316 and define attributes of the property types. In an embodiment, a user of the system uses link type editor 1328 to create the link types 1330. Alternatively, other programs, processes, or programmatic controls may be used to create link types and property types and define attributes, and using editors is not required.

In an embodiment, creating a property type 1316 using the property type editor 1326 involves defining at least one parser definition using a parser editor 1322. A parser definition comprises metadata that informs parser 1302 how to parse input data 1300 to determine whether values in the input data can be assigned to the property type 1316 that is associated with the parser definition. In an embodiment, each parser definition may comprise a regular expression parser 1304A or a code module parser 1304B. In other embodiments, other kinds of parser definitions may be provided using scripts or other programmatic elements. Once defined, both a regular expression parser 1304A and a code module parser 1304B can provide input to parser 1302 to control parsing of input data 1300.

Using the data types defined in the ontology, input data 1300 may be parsed by the parser 1302 determine which item type 1310 should receive data from a record created from the input data, and which property types 1316 should be assigned to data from individual field values in the input data. Based on the item/object-property mapping 1301, the parser 1302 selects one of the parser definitions that is associated with a property type in the input data. The parser parses an input data field using the selected parser definition, resulting in creating new or modified data 1303. The new or modified data 1303 is added to the database 1209 according to ontology 205 by storing values of the new or modified data in a property of the specified property type. As a result, input data 1300 having varying format or syntax can be created in database 1209. The ontology 1205 may be modified at any time using item/object type editor 1324, property type editor 1326, and link type editor 1328, or under program control without human use of an editor. Parser editor 1322 enables creating multiple parser definitions that can successfully parse input data 1300 having varying format or syntax and determine which property types should be used to transform input data 300 into new or modified input data 1303.

The properties, data items, and links (e.g. relationships) between the data items can be visualized using a graphical user interface ("GUI"). For example, FIG. 9C displays a user interface showing a graph representation 1403 of relationships (including relationships and/or links 1404, 1405, 1406, 1407, 1408, 1409, 1410, 1411, 1412, and 1413) between the data items (including data items 1421, 1422, 1423, 1424, 1425, 1426, 1427, 1428, and 1429) that are represented as nodes in the example of FIG. 9C. In this embodiment, the data items include person data items 1421, 1422, 1423, 1424, 1425, and 1426; a flight item 1427; a financial account 1428; and a computer data item 1429. In this example, each person node (associated with person data items), flight node (associated with flight data items), financial account node (associated with financial account data items), and computer node (associated with computer data items) may have relationships and/or links with any of the other nodes through, for example, other data items such as payment data items.

Figure 9C:
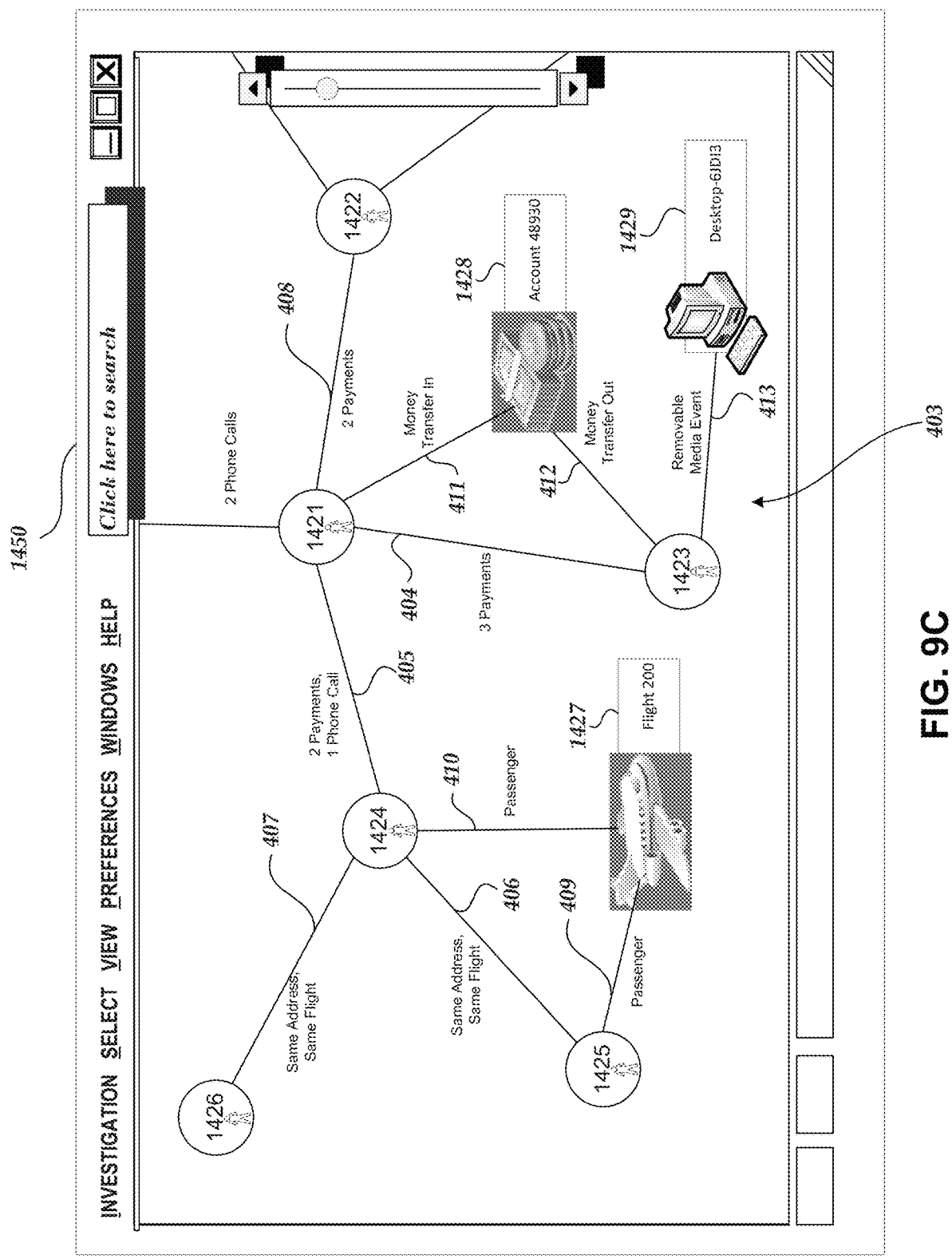
FIG. 9C illustrates a sample user interface using relationships described in a data store using a dynamic ontology.

For example, in FIG. 9C, relationship 1404 is based on a payment associated with the individuals indicated in person data items 1421 and 1423. The link 1404 represents these shared payments (for example, the individual associated with data item 1421 may have paid the individual associated with data item 1423 on three occasions). The relationship is further indicated by the common relationship between person data items 1421 and 1423 and financial account data item 1428. For example, link 1411 indicates that person data item 1421 transferred money into financial account data item 1428, while person data item 1423 transferred money out of financial account data item 1428. In another example, the relationships between person data items 1424 and 1425 and flight data item 1427 are indicated by links 1406, 1409, and 1410. In this example, person data items 1424 and 1425 have a common address and were passengers on the same flight data item 1427. In an embodiment, further details related to the relationships between the various items may be displayed. For example, links 1411 and 1412 may, in some embodiments, indicate the timing of the respective money transfers. In another example, the time of the flight associated with the flight data item 1427 may be shown.

Relationships between data items may be stored as links, or in some embodiments, as properties, where a relationship may be detected between the properties. In some cases, as stated above, the links may be directional. For example, a payment link may have a direction associated with the payment, where one person data item is a receiver of a payment, and another person data item is the payer of payment.

In various embodiments, data items may further include malware analysis metadata and/or links. Such malware analysis metadata may be accessed by the data analysis system for displaying objects and features on the user interface (as described above).

In addition to visually showing relationships between the data items, the user interface may allow various other manipulations. For example, the data items within database 1108 may be searched using a search interface 1450 (e.g., text string matching of data item properties), inspected (e.g., properties and associated data viewed), filtered (e.g., narrowing the universe of data items into sets and subsets by properties or relationships), and statistically aggregated (e.g., numerically summarized based on summarization criteria), among other operations and visualizations.

Implementation Mechanisms

According to an embodiment, the data analysis system and other methods and techniques described herein are implemented by one or more special-purpose computing devices. For example, the server computing system 110 and/or client computer system 130, as illustrated in FIG. 1, may be implemented as special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Figure 10:
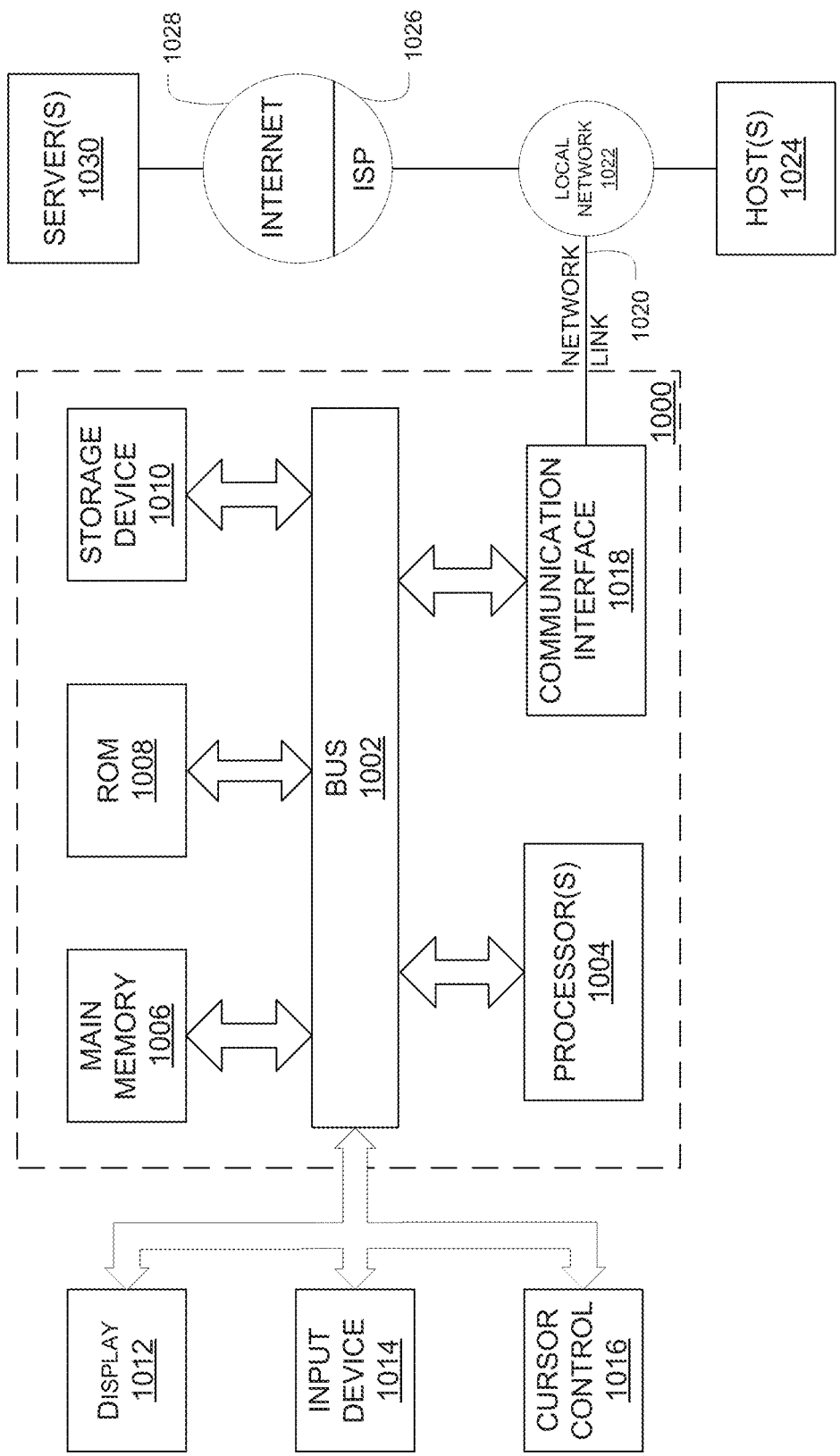
FIG. 10 illustrates a computer system with which certain methods discussed herein may be implemented.

For example, FIG. 10 is a block diagram that illustrates a computer system 1000 upon which the various systems and methods discussed herein may be implemented. For example, in various embodiments, any of the computing systems illustrated in FIG. 1, such client computer system 130 and/or server computing system 110, may be implemented as computer systems 1000 and/or servers 1030 as illustrated in FIG. 10.

Computer system 1000 includes a bus 1002 or other communication mechanism for communicating information, and a hardware processor, or multiple processors, 1004 coupled with bus 1002 for processing information. Hardware processor(s) 1004 may be, for example, one or more general purpose microprocessors.

Computer system 1000 also includes a main memory 1006, such as a random access memory (RAM), cache and/or other dynamic storage devices (or computer readable storage medium), coupled to bus 1002 for storing information and instructions to be executed by processor 1004. Main memory 1006 also may be used for storing temporary variables or other intermediate information during execution of instructions to be executed by processor 1004. Such instructions, when stored in storage media (e.g., computer readable storage medium) accessible to processor 1004, render computer system 1000 into a special-purpose machine that is customized to perform the operations specified in the instructions.

Computer system 1000 further includes a read only memory (ROM) 10010 or other static storage device (e.g., computer readable storage medium) coupled to bus 1002 for storing static information and instructions for processor 1004. A storage device 1010, such as a magnetic disk, optical disk, or USB thumb drive (Flash drive), and/or any other suitable data store, is provided and coupled to bus 1002 for storing information (for example, file data items, analysis information data items, submission data items, and/or the like) and instructions.

Computer system 1000 may be coupled via bus 1002 to a display 1012, such as a cathode ray tube (CRT), LCD display, or touch screen display, for displaying information to a computer user and/or receiving input from the user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1000 may include a user interface module (e.g., implemented by workflow engine 124 as illustrated in FIG. 1), and/or various other types of modules to implement one or more graphical user interface of the data analysis system, as described above. The modules may be stored in a mass storage device (e.g., a computer readable storage medium) as executable software codes that are executed by the computing device(s).

As mentioned, computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more modules and/or instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

Various forms of media (e.g., computer readable storage mediums) may be involved in carrying one or more sequences of one or more instructions to processor 1004 for execution. For example, the instructions may initially be carried on a magnetic disk or solid state drive of a remote computer. The remote computer can load the instructions and/or modules into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 10110 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or WAN component to communicated with a WAN). Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media. In some embodiments, network 150 (as illustrated in FIG. 1) may correspond to a local network 1022 and/or Internet 1028.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. For example, in an embodiment various aspects of the data analysis system may be implemented on one or more of the servers 1030 and may be transmitted to and from the computer system 1000. For example, submitted malware data items may be transmitted to one of the servers 1030, aspects of the basic analysis may be implemented on one or more of the servers 1030, and/or aspects of the external analysis may be implemented on one or more of the servers 1030. In an example, requests for external analyses of file data items may be transmitted to one or more third-party servers 1030 (from, for example, the computer system 1000 and/or another server 1030 of the system), and analysis data may then be transmitted back from third-party servers 1030.

In an embodiment, the data analysis system may be accessible by the user through a web-based viewer, such as a web browser. In this embodiment, the user interfaces of the system may be generated by a server (such as one of the servers 1030) and/or the computer system 1000 and transmitted to the web browser of the user. The user may then interact with the user interfaces through the web-browser. In an embodiment, the computer system 1000 may comprise a mobile electronic device, such as a cell phone, smartphone, and/or tablet. The system may be accessible by the user through such a mobile electronic device, among other types of electronic devices.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method, comprising:
   retrieving a plurality of data objects;
   creating an aggregated data object for an entity, wherein creating the aggregated data object for the entity comprises:
      determining a confidence value for an association between one or more of the plurality of data objects and the entity based at least in part upon one or more attribute types and attribute values associated with the one or more data objects; and
      generating metadata associating the one or more data objects with the entity based at least in part on the confidence value, wherein the metadata is stored separately from the one or more data objects;
   receiving one or more events associated with the aggregated data object;
   calculating a score for the aggregated data object based at least in part on an attribute from the one or more events; and
   providing an alert associated with the score substantially in real time in response to receiving the one or more events.

2. The computer-implemented method of claim 1, wherein calculating the score for the aggregated data object further comprises:
   applying a scoring model to the aggregated data object, wherein applying the scoring model further comprises:
      extracting a plurality of scoring factors associated with the aggregated data object; and
      combining the plurality of scoring factors and a plurality of weights, wherein combining the plurality of scoring factors and the plurality of weights results in the score.

3. The computer-implemented method of claim 2, further comprising:
   receiving training data comprising a plurality of entities and a plurality of events; and
   training the scoring model with the training data.

4. The computer-implemented method of claim 1, wherein calculating the score for the aggregated data object further comprises:
   determining that the event corresponds to a certain type of event; and
   in response to determining that the event corresponds to the certain type of event, increasing a value of the score to an updated score.

5. The computer-implemented method of claim 1, wherein calculating the score for the aggregated data object further comprises:
   determining that a plurality of events occurred within a period of time; and
   in response to determining that a plurality of events occurred within the period of time, increasing a value of the score to an updated score.

6. The computer-implemented method of claim 1, wherein calculating the score for the aggregated data object further comprises:
   extracting a first attribute from the aggregated data object, wherein the first attribute indicates a first geographic location of the entity;
   extracting a second attribute from the event, wherein the second attribute indicates a second geographic location of the event;
   determining that the first geographic location is within a threshold distance of the second geographic location; and
   in response to determining that the first geographic location is within the threshold distance of the second geographic location, increasing a value of the score to an updated score.

7. The computer-implemented method of claim 1, further comprising:
   causing presentation, in a user interface, of (i) a representation of the entity and (ii) the score.

8. The computer-implemented method of claim 7, further comprising:
   causing presentation, in the user interface, of (i) representations for a plurality of entities and (ii) a corresponding score for each entity of the plurality of entities.

9. The computer-implemented method of claim 8, further comprising:
   causing presentation, in the user interface, of a geographic location associated with each entity of the plurality of entities.

10. The computer-implemented method of claim 1, wherein providing the alert further comprises:
    transmitting the alert to a user computing device.

11. A computer system, comprising:
    one or more computer readable storage mediums configured to store computer executable instructions; and
    one or more computer processors in communication with the one or more computer readable storage mediums and configured to execute the computer executable instructions in order to cause the computer system to:
       retrieve a plurality of data objects;
       create an aggregated data object for an entity, wherein creating the aggregated data object for the entity comprises:
          determining a confidence value for an association between one or more of the plurality of data objects and the entity based at least in part upon one or more attribute types and attribute values associated with the one or more data objects; and generating metadata associating the one or more data objects with the entity based at least in part on the confidence value, wherein the metadata is stored separately from the one or more data objects;

receive one or more events associated with the aggregated data object;

calculate a score for the aggregated data object based at least in part on an attribute from the event; and provide an alert associated with the score substantially in real time in response to receiving the one or more events.

12. The computer system of claim 11, wherein calculating the score for the aggregated data object further comprises:

applying a scoring model to the aggregated data object, wherein applying the scoring model further comprises:

extracting a plurality of scoring factors associated with the aggregated data object; and combining the plurality of scoring factors and a plurality of weights, wherein combining the plurality of scoring factors and the plurality of weights results in the score.

13. The computer system of claim 12, wherein the one or more computer processors are configured to execute further computer executable instructions to cause the computer system to:

receive training data comprising a plurality of entities and a plurality of events; and train the scoring model with the training data.

14. The computer system of claim 11, wherein calculating the score for the aggregated data object further comprises:

determining that the event corresponds to a certain type of event; and in response to determining that the event corresponds to the certain type of event, increasing a value of the score to an updated score.

15. The computer system of claim 11, wherein calculating the score for the aggregated data object further comprises:

determining that a period of time has passed following the event; and in response to determining that the period of time has passed following the event, decreasing a value of the score to an updated score.

16. The computer system of claim 15, wherein decreasing the value of the score further comprises:

decreasing a weight associated with the event.

17. The computer system of claim 11, wherein calculating the score for the aggregated data object further comprises:

extracting a first attribute from the aggregated data object, wherein the first attribute indicates a first geographic location of the entity;

extracting a second attribute from the event, wherein the second attribute indicates a second geographic location of the event;

determining that the first geographic location is within a threshold distance of the second geographic location; and in response to determining that the first geographic location is within the threshold distance of the second geographic location, increasing a value of the score to an updated score.

18. The computer system of claim 11, wherein the one or more computer processors are configured to execute further computer executable instructions to cause the computer system to:

cause presentation, in a user interface, of (i) a representation of the entity and (ii) the score.

19. The computer system of claim 18, wherein the one or more computer processors are configured to execute additional computer executable instructions to cause the computer system to:

cause presentation, in the user interface, of (i) representations for a plurality of entities and (ii) a corresponding score for each entity of the plurality of entities.

20. The computer system of claim 18, wherein the one or more computer processors are configured to execute additional computer executable instructions to cause the computer system to:

re-calculate an updated score for the aggregated data object based at least in part on a second event; and cause presentation, in the user interface, of the updated score.

* * * * *